United States Patent
Jeong et al.

(10) Patent No.: US 11,269,785 B2
(45) Date of Patent: Mar. 8, 2022

(54) CACHE SYSTEMS OF MEMORY SYSTEMS AND DATA CACHING METHODS OF CACHE SYSTEMS

(71) Applicant: SK hynix Inc., Icheon-si (KR)

(72) Inventors: Seung Gyu Jeong, Gwangmyeong-si (KR); Dong Gun Kim, Hwaseong-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/712,478

(22) Filed: Dec. 12, 2019

(65) Prior Publication Data

US 2020/0349089 A1 Nov. 5, 2020

(30) Foreign Application Priority Data

May 3, 2019 (KR) .................. 10-2019-0052599

(51) Int. Cl.
*G06F 12/123* (2016.01)
*G06F 12/0804* (2016.01)

(52) U.S. Cl.
CPC ........ *G06F 12/124* (2013.01); *G06F 12/0804* (2013.01); *G06F 2212/1032* (2013.01); *G06F 2212/608* (2013.01)

(58) Field of Classification Search
CPC .............. G06F 12/124; G06F 12/0804; G06F 2212/608; G06F 2212/1032; G06F 2212/1016; G06F 2212/402; G06F 12/0864; G06F 12/0893
See application file for complete search history.

(56) References Cited

U.S. PATENT DOCUMENTS

| | | | | |
|---|---|---|---|---|
| 5,307,477 A | * | 4/1994 | Taylor | G06F 12/0888 711/122 |
| 6,490,655 B1 | * | 12/2002 | Kershaw | G06F 12/0804 711/105 |
| 8,180,968 B2 | | 5/2012 | O'Krafka et al. | |
| 9,218,292 B2 | * | 12/2015 | Goodman | G06F 12/122 |
| 9,710,383 B1 | * | 7/2017 | Xu | G06F 12/0246 |
| 2017/0075601 A1 | * | 3/2017 | Noguchi | G06F 3/064 |
| 2019/0339865 A1 | * | 11/2019 | Bains | G06F 12/0246 |
| 2020/0250043 A1 | * | 8/2020 | Prabhakar | G06F 11/1471 |

FOREIGN PATENT DOCUMENTS

KR 1020160033737 A 3/2016

* cited by examiner

*Primary Examiner* — Sean D Rossiter
(74) *Attorney, Agent, or Firm* — William Park & Associates Ltd.

(57) ABSTRACT

A cache system includes a cache memory having a plurality of blocks, a dirty line list storing status information of a predetermined number of dirty lines among dirty lines in the plurality of blocks, and a cache controller controlling a data caching operation of the cache memory and providing statuses and variation of statuses of the dirty lines, according to the data caching operation, to the dirty line list. The cache controller performs a control operation to always store status information of a least-recently-used (LRU) dirty line into a predetermined storage location of the dirty line list.

16 Claims, 31 Drawing Sheets

CACHE SYSTEMS OF MEMORY SYSTEMS AND DATA CACHING METHODS OF CACHE SYSTEMS

CROSS-REFERENCE TO RELATED APPLICATIONS

The present application claims priority under 35 U.S.C. 119(a) to Korean Application No. 10-2019-0052599, filed on May 3, 2019, which is herein incorporated by references in its entirety.

BACKGROUND

1. Technical Field

Various embodiments of the disclosed technology generally relate to memory systems and, more particularly, to cache systems of memory systems and methods of caching data in the cache systems.

2. Related Art

In memory systems, a memory generally operates at a relatively low speed compared to a host, such as a central processing unit (CPU). Thus, a cache system, including a cache memory, has been widely employed in most of the memory systems to solve the problems which arise due to the speed difference between the host and the memory. The cache system, included in in the memory system, may be disposed between the host and the memory, may be disposed in the host controller, or may be disposed in the memory controller.

SUMMARY

According to an embodiment, a cache system includes a cache memory configured to have a plurality of blocks, a dirty line list configured to store status information of a predetermined number of dirty lines among dirty lines in the plurality of blocks, and a cache controller configured to control a data caching operation of the cache memory and configured to provide statuses and variation of statuses of the dirty lines, according to the data caching operation, to the dirty line list. The cache controller performs a control operation to always store status information of a least-recently-used (LRU) dirty line into a predetermined storage location of the dirty line list.

According to another embodiment, there is provided a data caching method of a cache system including a cache memory having a plurality of blocks, a dirty line list having a plurality of nodes storing status information of a predetermined number of dirty lines among dirty lines in the plurality of blocks, and a cache controller controlling a data caching operation of the cache memory and a storage status of the status information of the nodes of the dirty line list. The method includes storing information on a least-recently-used (LRU) dirty line among the dirty lines in the cache memory into a lowest-order node among the nodes of the dirty line list and forcibly evicting a dirty line having status information stored in the lowest-order node among the nodes of the dirty line list when an overflow occurs due to the number of the dirty lines after the data caching operation, wherein the overflow involves the increased number of the dirty lines exceeding the number of the nodes in the dirty line list.

BRIEF DESCRIPTION OF THE DRAWINGS

Certain features of the disclosed technology are illustrated by various embodiments with reference to the attached drawings, in which.

DETAILED DESCRIPTION OF THE EMBODIMENTS

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Accordingly, the terms such as "on", "over", "above", "under", "beneath", "below" and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may form a connection relationship or coupling relationship by replacing the other element therebetween.

A write-back method, among various methods of writing data into a cache memory of a cache system, may be achieved by storing new data only in the cache memory when a write request is outputted from the host and by storing the new data into the main memory (hereinafter, referred to as 'the memory') later. Thus, in this case, data stored in the cache memory may be inconsistent with data stored in a region (corresponding to the cache memory) of the memory. The region of the cache memory with the data that is different from the data stored in the memory may be defined as a dirty line. When a power supply of the cache memory is suddenly interrupted while the dirty line exists in the cache memory, an event may occur in which all of the data, stored in the cache memory, is not written into the memory. In general, if a suddenly-power-off (SPO) event occurs in the cache memory, the data in the cache memory, inconsistent with the data of the memory, may be written into the memory for a limited time based on a chargeable element, such as a capacitor. Thus, the number of dirty lines in the cache memory has to be equal to or less than the number of dirty lines which are able to be written into the memory during the limited time provided by the chargeable element when the SPO event occurs. Various embodiments of the disclosed technology may provide cache systems that control the number of dirty lines by using a dirty line list and data caching methods of the cache systems. According to the various embodiments, in selecting eviction data of the cache memory to maintain the predetermined number of dirty lines, it may be possible to immediately find out information on a least-recently-used (LRU) dirty line.

Figure 1:
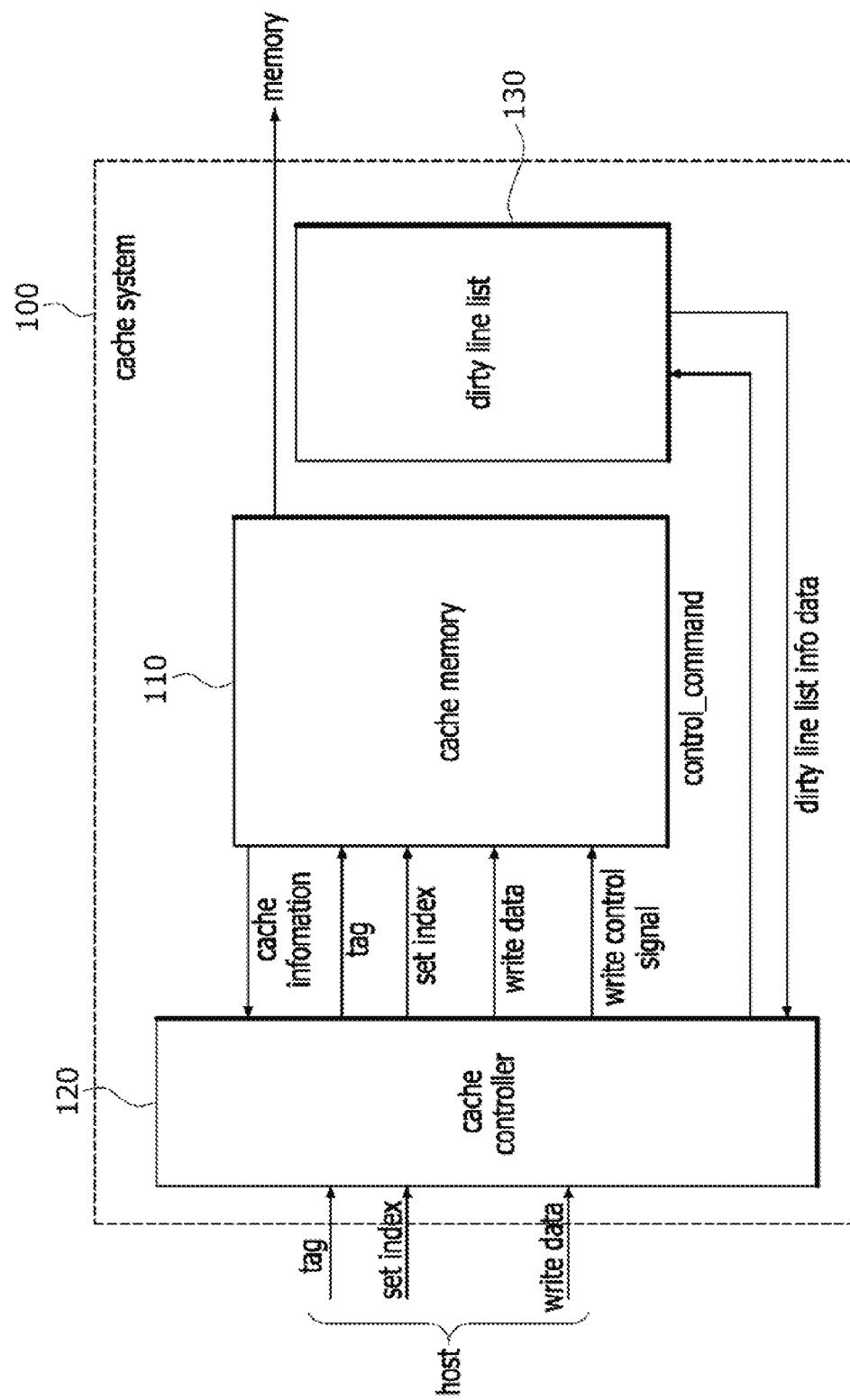
FIG. 1 is a block diagram, illustrating an example of a cache system of a memory system, according to an embodiment of the present disclosure.
Figure 2:
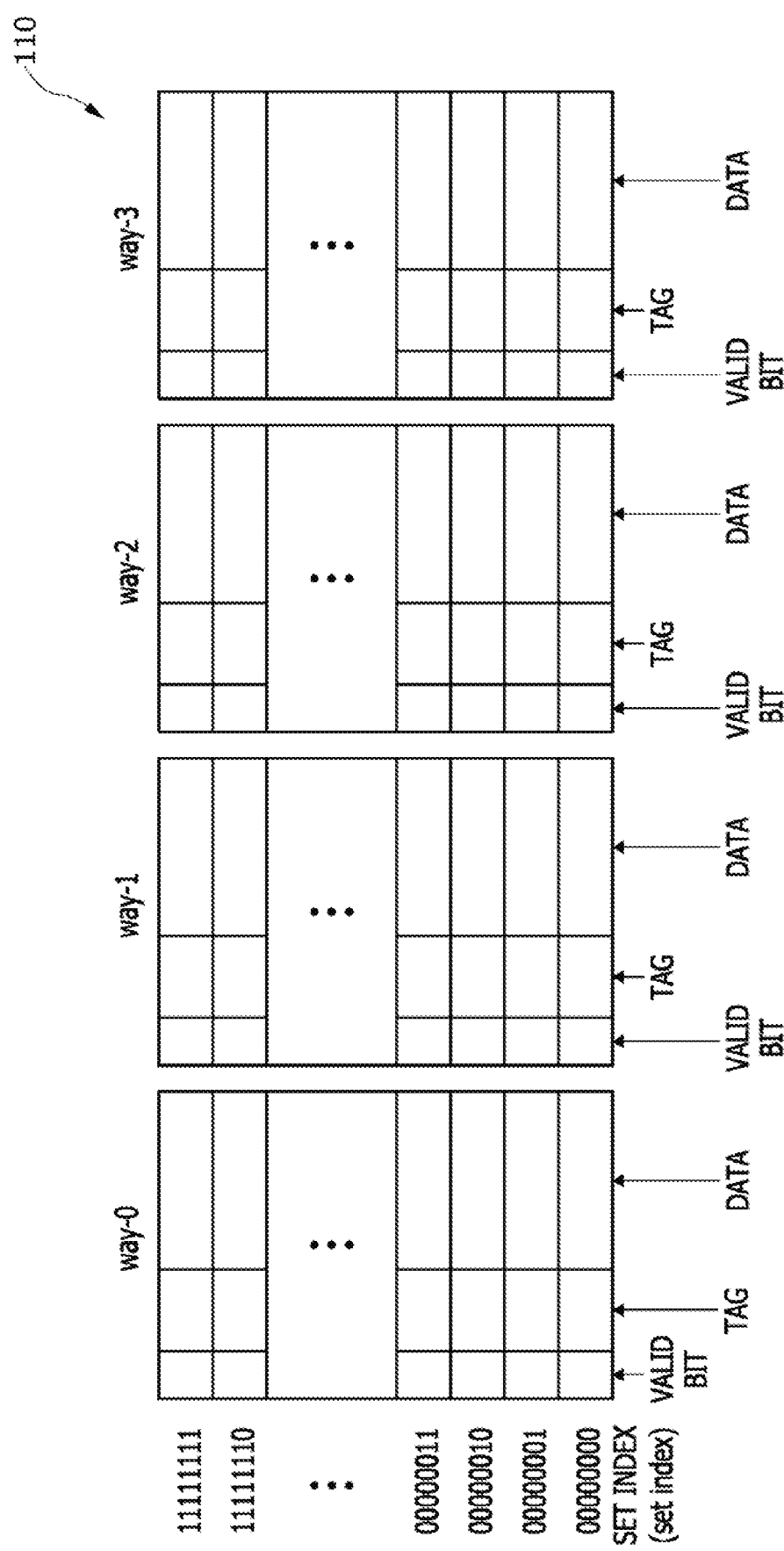
FIG. 2 is a schematic view, illustrating a configuration of a cache memory of a cache system included in a memory system, according to an embodiment of the present disclosure.
Figure 3:
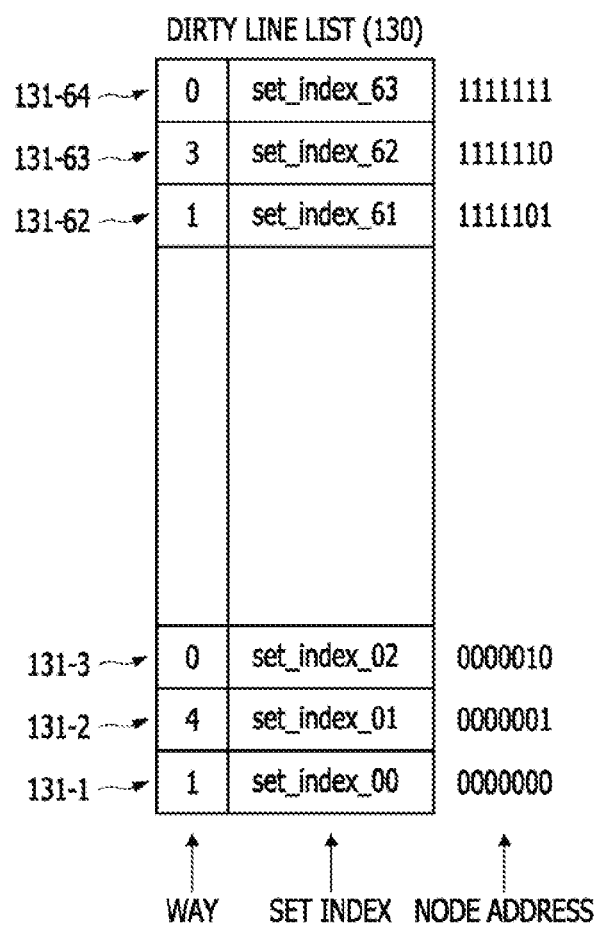
FIG. 3 is a schematic view, illustrating a configuration of a dirty line list of a cache system included in a memory system, according to an embodiment of the present disclosure.

FIG. 1 is a block diagram, illustrating a cache system 100 of a memory system, according to an embodiment of the present disclosure. FIG. 2 is a schematic view, illustrating a configuration of a cache memory 110, included in the cache system 100 of FIG. 1, and FIG. 3 is a schematic view, illustrating a configuration of a dirty line list 130, included in the cache system 100 of FIG. 1. Referring to FIG. 1, the cache system 100 may be coupled between a host and a memory to perform a data caching operation in response to a data write request from the host. In an embodiment, the host may be a processor, such as a central processing unit (CPU). In an embodiment the memory may be a volatile memory, such as a dynamic random access memory (DRAM), or a nonvolatile memory, such as a phase change random access memory (PCRAM). In an embodiment, the cache system 100 may be configured to include the cache memory 110, a cache controller 120, and the dirty line list 130. The cache memory 110 may have storage regions in which data, transmitted from the host to the memory, is temporarily stored. In an embodiment, the cache memory 110 may include a static random access memory (SRAM) or a DRAM. The data stored in the cache memory 110 may be transmitted to the memory by a control operation of the cache controller 120.

As illustrated in FIG. 2, the cache memory 110 may include four ways (i.e., first to fourth ways WAY-0, WAY-1, WAY-2, and WAY-3). Although FIG. 2 illustrates an example in which the cache memory 110 includes four ways, the disclosed technology is not limited thereto. That is, in some other embodiments, the number of ways included in the cache memory 110 may be less or greater than four. In this particular embodiment, the ways WAY-0, WAY-1, WAY-2, and WAY-3 may have the same number of blocks. For example, each of the ways WAY-0, WAY-1, WAY-2, and WAY-3 may have 256 blocks. The blocks, constituting each of the ways WAY-0, WAY-1, WAY-2 and WAY-3, may be distinguished from each other by their own set indexes, each of which is comprised of a binary stream. For example, a first block of each of the ways WAY-0, WAY-1, WAY-2, and WAY-3, may have a set index of '00000000', and a last block of each of the ways WAY-0, WAY-1, WAY-2, and WAY-3, may have a set index of '11111111'. The set index may correspond to a portion of an address designating a data storage region in the memory. A valid bit, a tag, and a set of data may be stored in each of the blocks. The valid bit may indicate validity of data and may have a value of '0' or '1'. The tag may constitute an address designating a data storage region in the memory together with a binary stream of a set index of the tag. For example, a block having a set index of '00000000' and a tag of '11' may correspond to an address of '1100000000' among the plurality of addresses of the memory.

Referring to FIGS. 1 and 2, the cache controller 120 may receive write-related information, for example, a set index, a tag, and write data from the host to perform a series of control operations for a data caching operation of the cache memory 110. The cache controller 120 may receive the cache information from the cache memory 110, for the data caching operation, and may transmit the set index, the tag, the write data, and a write control signal to the cache memory 110. In addition, the cache controller 120 may transmit a control command CONTROL_COMMAND to the dirty line list 130 to perform a control operation of the dirty line list 130.

Specifically, if the tag, the set index, and the write data are transmitted from the host to the cache controller 120, the cache controller 120 may receive the cache information from the cache memory 110. The cache information may include information on whether the tag, outputted from the host, exists in the cache memory 110. The cache controller 120 may determine whether the write data is the data corresponding to "write hit" or "write miss," according to the cache information, and may perform a cache write operation according to a result of the determination. The cache write operation may be performed by transmitting the write control signal, together with the tag, the set index, and the write data, outputted from the host to the cache memory 110. If a dirty line distribution in the cache memory 110 is changed by the cache write operation, the cache controller 120 may transmit the control command CONTROL_COMMAND to reflect the change of the dirty line distribution to the dirty line list 130.

As illustrated in FIG. 3, the dirty line list 130 may be comprised of a register stack including a plurality of nodes, for example, first to sixty fourth nodes 131-1, 131-2, . . . , 131-63, and 131-64. Although FIG. 3 illustrates an example in which the number of the nodes is "64", the disclosed technology is not limited thereto. That is, the number of the nodes may be defined as the number of blocks of the cache memory 110 capable of being written into the memory by the chargeable element in the cache system 100 when an SPO event occurs. In the present embodiment, it may be assumed that data stored in 64 dirty lines of the cache memory 110 are written into the memory when an SPO event occurs. Each of the plurality of nodes 131-1, 131-2, . . . , 131-63, and 131-64 may store status information of any one of the dirty lines in the cache memory 110. In an embodiment, the status information of each of the dirty lines may include information on a way and a set index of the corresponding dirty line in the cache memory 110. For example, the first node 131-1 storing a way of '1' and a set index of 'set_index_00' may represent that a block designated by the way of '1' and the set index of 'set_index_00' in the cache memory 100 is a dirty line. In different embodiments, when the cache memory 100 is configured to have only one way, the plurality of nodes 131-1, 131-2, . . . , 131-63, and 131-64 might not have any "way" information. In an embodiment, the plurality of nodes 131-1, 131-2, . . . , 131-63 and 131-64 may have node addresses from a binary number of '0000000' to a binary number of '1111111', respectively. Locations of the nodes 131-1, 131-2, . . . , 131-63, and 131-64, constituting the dirty line list 130, may be designated by the node addresses thereof, respectively.

When a first dirty line is generated by the data caching operation of the cache system 100, the information on a set index and a way of the first dirty line may be stored into the first node 131-1, corresponding to a lowest-order storage region, having an address of '0000000'. Thereafter, whenever dirty lines are generated, a set of information on the set indexes and the ways of the generated dirty lines may be sequentially stored into the nodes 131-1, 131-2, . . . , 131-63, and 131-64 in order of the node addresses. This occurs until an eviction operation is performed in the cache system 100 to change the dirty lines. In the dirty line list 130, according to present embodiment, the status information of the LRU dirty line is always stored into a lowest-order node, that is, the first node 131-1 having a lowest-order node address of '0000000'. Furthermore, if a value of the node address increases, the status information of a dirty line having a less LRU time may be stored into the first node 131-1. Thus, the status information of the MRU dirty line may be stored into a node having the highest-order node address among the nodes in which the status information of the dirty lines is stored.

If the status information of the dirty lines is stored into all of the nodes 131-1, 131-2, . . . , 131-63, and 131-64 of the dirty line list 130, the dirty line list 130 may be regarded as having an overflow status. In contrast, if at least one of the nodes 131-1, 131-2, . . . , 131-63 and 131-64 of the dirty line list 130 is empty, the dirty line list 130 may be regarded as having a non-overflow status.

If a forced eviction occurs in the cache memory 110, the cache controller 120 may allocate the dirty line corresponding to the status information stored in the first node 131-1, having the lowest-order node address (e.g., a node address of '0000000') in the dirty line list 130, as a target of the forced eviction. Accordingly, when the forced eviction occurs in the cache memory 110, an eviction operation of the LRU dirty line is automatically performed without any search operation to find the LRU dirty line. After the forced eviction terminates, the status information (on the dirty line) stored in the first node 131-1 may be deleted.

When a normal eviction is executed in the cache memory 110, the cache controller 120 may perform a control operation that moves the status information stored in one of the nodes 131-1, 131-2, . . . , 131-63, and 131-64 of the dirty line list 130 to another node. Specifically, when a normal eviction operation of a dirty line, corresponding to the status information stored in the second node 131-2 having a node address of '0000001,' has to be executed, the status information stored in the second node 131-2 may be moved to a node having a highest-order node address among the nodes 131-1, 131-2, . . . , 131-63 and 131-64 in which the status information of the dirty lines is stored. In addition, the previous status information stored in the nodes 131-3, . . . and 131-64 may be shifted to the nodes 131-2, . . . and 131-63, respectively. For example, when the normal eviction operation of the dirty line, corresponding to the second node 131-2 having a node address of '0000001,' has to be executed, the status information stored in the second node 131-2 may be moved to the highest-order node 131-64 and the status information (a way of '0' and a set index of 'set_index_63') stored in the highest-order node 131-64 (i.e., the sixty fourth node) may be shifted to the second highest-order node 131-63 (i.e., the sixty third node), having a node address of '1111110'. In addition, the status information (a way of '3' and a set index of 'set_index_62') stored in the second highest-order node 131-63 (i.e., the sixty third node) may be shifted to the third highest-order node 131-62 (i.e., the sixty second node), having a node address of '1111101'. In the same way, the status information (a way of '0' and a set index of 'set_index_02') stored in the third lowest-order node 131-3 (i.e., the third node) may be shifted to the second lowest-order node 131-2 (i.e., the second node), which is empty due to the normal eviction.

The data caching operation of the cache system 100 may include the data caching operation, according to the "write hit," and the data caching operation according to the "write miss". In the present embodiment, the "write hit" may be defined as a case in which the same tag of the write data exists in a block of the cache memory 110, having a set index to which the write data is written. Thus, when there is a "write hit", the data caching operation may be performed while data in a region of the memory, having an address to be written, is stored in a block of the cache memory 110 in which the cache write operation is performed. In such a case, if the data stored in the cache memory 110 is consistent with data stored in a region of the memory, having the same address as the data stored in the cache memory 110, that is, no dirty line is created in the cache memory 110, the total number of dirty lines may increase due to the cache write operation. In contrast, if the data stored in the cache memory 110 is inconsistent with data stored in the memory, having the same address as the data stored in the cache memory 110, that is, a dirty line is created in the cache memory 110, one dirty line may be added due to the cache write operation but the total number of dirty lines might not be changed because the previous dirty line is removed.

The "write miss" may be defined as a case in which the same tag of the write data does not exist in a block of the cache memory 110, having a set index to which the write data are written. Thus, when there is a "write miss", the data caching operation may be performed while data in a region of the memory, having a second address different from a first address to be written, is stored in a block of the cache memory 110 in which the cache write operation is performed. In such a case, if the data stored in the cache memory 110 is consistent with data stored in a region of the memory, having the second address that is identical to an address of the data stored in the cache memory 110, that is, no dirty line is created in the cache memory 110, the total number of dirty lines may increase due to the cache write operation. In contrast, if the data stored in the cache memory 110 is inconsistent with data stored in a region of the memory, having the second address that is identical to an address of the data stored in the cache memory 110, that is, a dirty line is created in the cache memory 110, the cache write operation may be performed after an eviction operation for writing the data stored in the cache memory 110 into a region of the memory having the second address. Thus, in this case, one dirty line may be added due to the cache write operation of the write data but the total number of dirty lines might not be changed due to the fact that the previous dirty line is removed through the eviction operation. However, if the data stored in the cache memory 110 is consistent with data stored in a region of the memory, having the second address that is identical to an address of the data stored in the cache memory 110, that is, no dirty line is created in the cache memory 110, the cache write operation may be performed without any eviction operation. Thus, in such a case, the total number of dirty lines may increase due to the addition of a dirty line created by the cache write operation of the write data.

Figure 4:
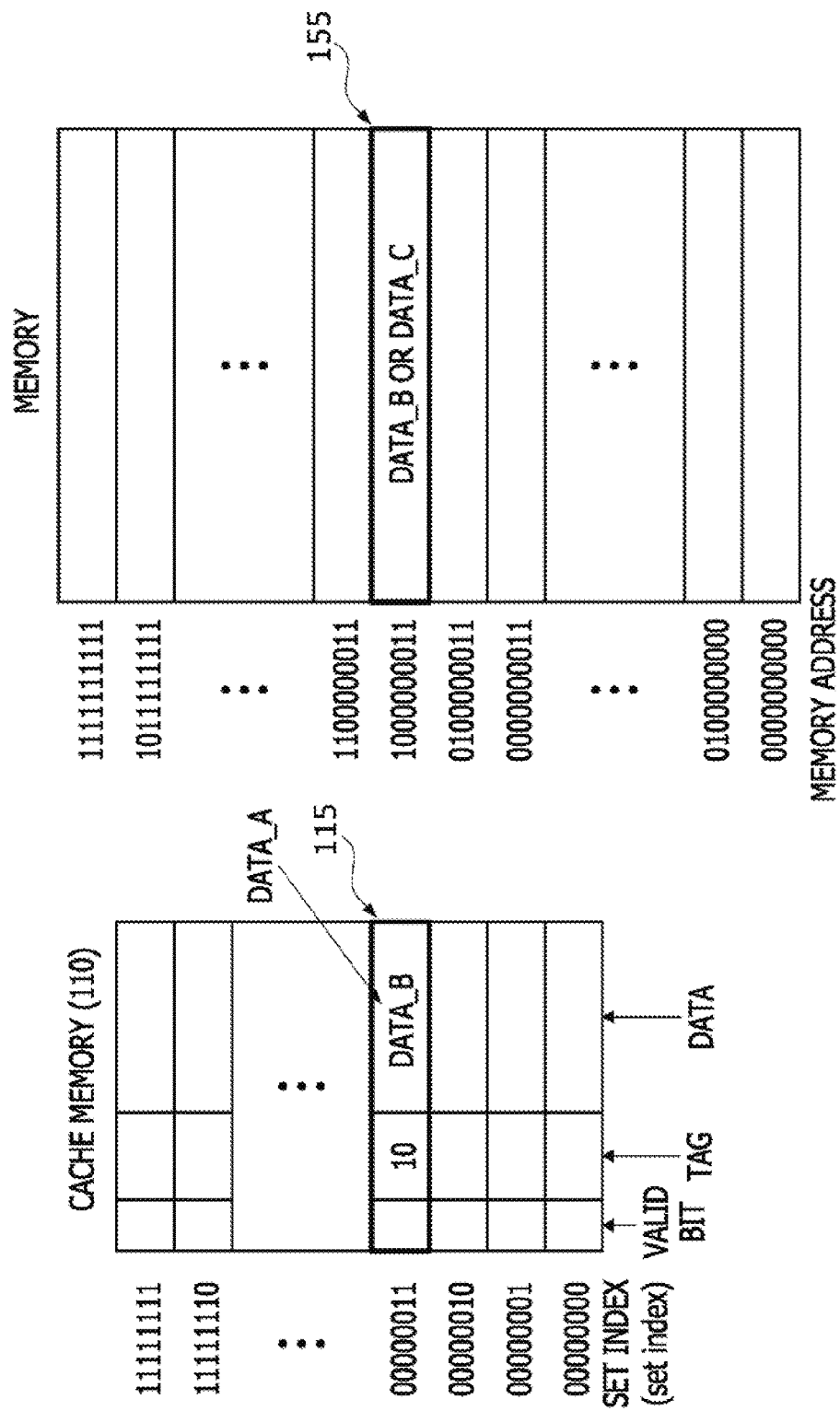
FIG. 4 is a schematic view, illustrating a data caching operation when there is a "write hit" of a cache system included in a memory system, according to an embodiment of the present disclosure.

FIG. 4 is a schematic view, illustrating the data caching operation when there is a "write hit" of the cache system 100. Referring to FIG. 4, the present embodiment will be described based on a scenario in which a request occurs to write the first data DATA_A into a region 155, having a memory address of '1000000011,' in the memory. In addition, the present embodiment will be described based on a scenario in which a tag of '10' and second data DATA_B are stored in a block 115, having a set index of '00000011,' in the cache memory 110. Because the memory address of the region into which the first data DATA_A have to be written is a binary number of '1000000011', the cache write operation may be performed using the block 115 as a target block in the cache memory 110 and a binary number of '10' may be stored as a tag. Specifically, the cache controller 120 may access the cache information in the cache memory 110 in response to the request of the host to retrieve the tag information stored in the block 115. In the present embodiment, because the tag of '10' is stored in the block 115, the cache controller 120 may perform the cache write operation according to the "write hit". In such a case, the block 115 may be a dirty line or might not be a dirty line.

In the case that the second data DATA_B is stored in the block 115, and the second data DATA_B is stored even in the region 155, the block 115 might not correspond to a dirty line. The second data DATA_B in the block 115 may be overwritten with the first data DATA_A by the cache write operation. The block 115 may be regarded as a dirty line by the cache write operation, and the total number of dirty lines may increase by one. In contrast, when the second data DATA_B is stored in the block 115, and the third data DATA_C, different from the second data DATA_B, is stored in the region 155, the block 115 may correspond to a dirty line. The second data DATA_B in the block 115 may be overwritten with the first data DATA_A by the cache write operation. The block 115 may be regarded as a dirty line by the cache write operation. However, because the previous dirty line, including the second data DATA_B, stored in the block 115 before the cache write operation, is removed by the cache write operation, the total number of dirty lines might not change.

Figure 5:
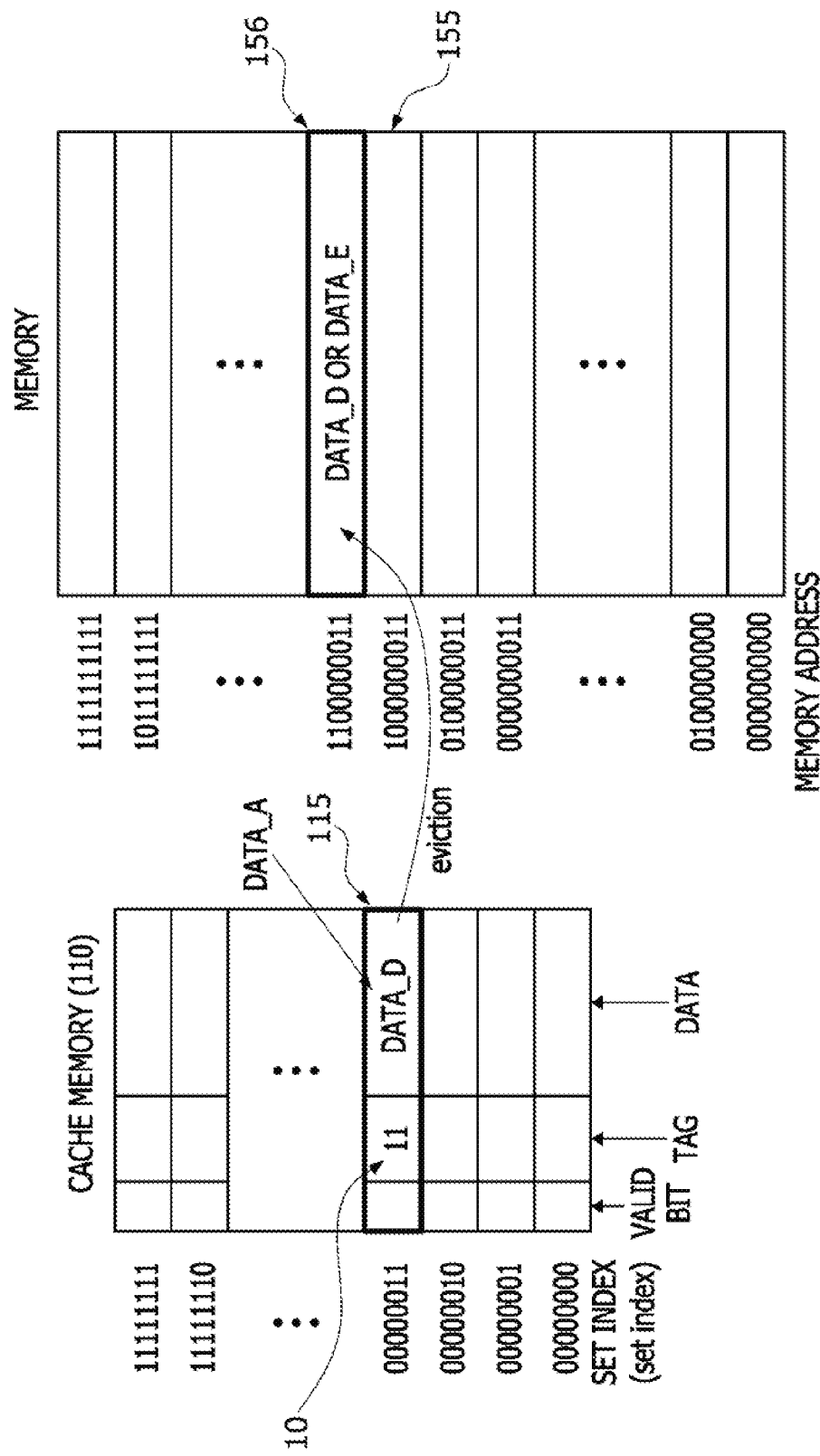
FIG. 5 is a schematic view, illustrating a data caching operation when there is a "write miss" of a cache system included in a memory system, according to an embodiment of the present disclosure.

FIG. 5 is a schematic view, illustrating the data caching operation when there is a "write miss" of the cache system 100. Referring to FIG. 5, the present embodiment will be described based on a scenario in which a request occurs to write the first data DATA_A into the region 155, having a memory address of '1000000011,' in the memory. In addition, the present embodiment will be described based on a scenario in which a tag of '11' and fourth data DATA_D are stored in the block 115, having a set index of '00000011,' in the cache memory 110. Because the memory address of the region into which the first data DATA_A have to be written is a binary number of '1000000011', the cache write operation may be performed using the block 115 as a target block in the cache memory 110 and a binary number of '10' may be stored as a tag. Specifically, the cache controller 120 may access the cache information in the cache memory 110 in response to the request of the host to retrieve the tag information stored in the block 115 having a set index of '00000011'. In the present embodiment, because the tag of '11' is stored in the block 115, the cache controller 120 may perform the cache write operation according to the "write miss". In such a case, the block 115 may be a dirty line or might not be a dirty line.

In the case that the fourth data DATA_D is stored in the block 115, and the fourth data DATA_D is stored even in a region 156, the block 115 might not correspond to a dirty line. The fourth data DATA_D in the block 115 may be overwritten with the first data DATA_A by the cache write operation, and the tag number '11' in the block 115 may be changed into '10'. The block 115 may be regarded as a dirty line by the cache write operation, and the total number of dirty lines may increase by one. In contrast, when the fourth data DATA_D is stored in the block 115, and the fifth data DATA_E, different from the fourth data DATA_D, is stored in the region 156, the block 115 may correspond to a dirty line. In such a case, before the cache write operation is performed, an eviction operation may be performed to move the fourth data DATA_D, stored in the block 115 (the dirty line). The eviction operation may be performed such that the fourth data DATA_D stored in the block 115 (the dirty line) is written into the memory region 156 having a memory address of '1100000011'. If the eviction operation terminates, the cache write operation may be performed to store the first data DATA_A into the block 115. Thus, the tag '11' in the block 115 may be changed to '10' by the cache write operation. In such a case, a new dirty line is created by the cache write operation, but the total number of dirty lines might not change since the previous dirty line, including the fourth data DATA_D, is removed by the eviction operation performed prior to the cache write operation.

Figure 6:
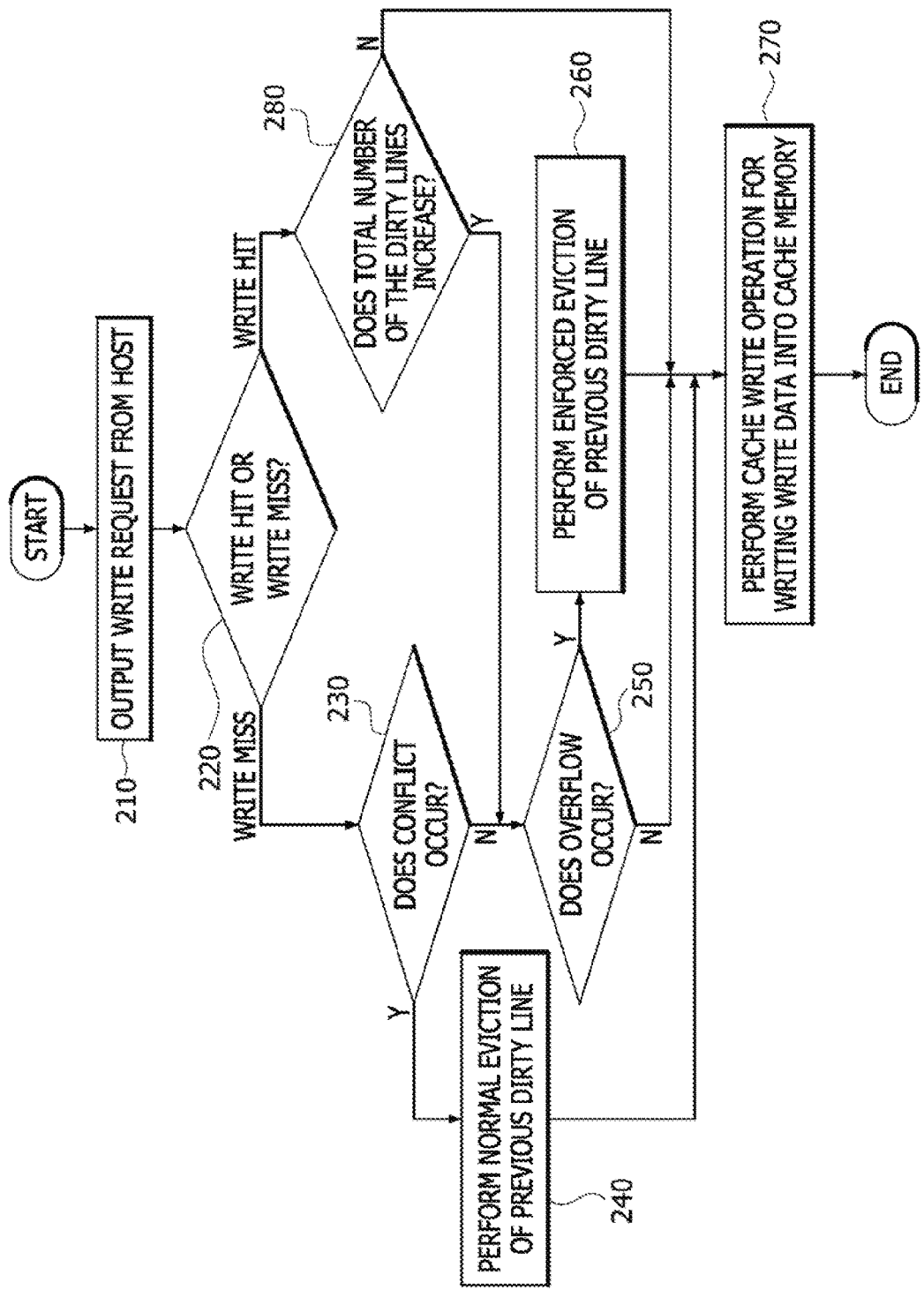
FIG. 6 is a flowchart, illustrating a data caching operation of a cache system included in a memory system, according to an embodiment of the present disclosure.

FIG. 6 is a flowchart, illustrating the data caching operation of the cache system 100, according to an embodiment of the present disclosure. Referring to FIG. 6, if a write request is outputted from the host at step 210, step 220 involves determining whether the write data, provided by the host, corresponds to a case of a "write hit" or a "write miss". If the write data corresponds to a case of a "write hit" at step 220, step 280 may be performed. Alternatively, if the write data provided by the host corresponds to a case of a "write miss" at step 220, step 230 may be performed. First, in the case of a "write miss", step 230 involves determining whether or not a conflict occurs. Step 230 may depend on whether the block of the cache memory 110, into which the write data have to be written, is a dirty line. If the block of the cache memory 110 is a dirty line, step 230 may determine that there is a conflict. In contrast, if the block of the cache memory 110 is not a dirty line, step 230 may determine that there is no conflict.

When a conflict occurs at step 230, a normal eviction operation of the block (i.e., the dirty line) of the cache memory 110, in which the write data have to be written, may be performed at step 240. In the present embodiment, the normal eviction operation may be defined as an eviction of the existing dirty line to replace the data stored in a block of the cache memory 110 with the write data. The data stored in the block may be written into the memory through the normal eviction operation. After the normal eviction operation, the cache write operation may be performed to write the write data into the cache memory 110 at step 270. Thus, the write data may be written into the block, through the cache write operation after being emptied by the normal eviction operation, and the tag of the renewed block may be changed.

When no conflict occurs at step 230, step 250 may determine whether there is an overflow of the cache memory 110. The determination of step 250 may be executed by judging whether the number of dirty lines exceeds a predetermined number after the data caching operation. In the present embodiment, the predetermined number of dirty lines may be defined as the number of blocks in the cache memory 110, capable of transmitting and writing the data into the memory when the SPO event occurs. In the present embodiment, the predetermined number of dirty lines may be equal to the number of storage regions in the dirty line list 130. If the number of dirty lines exceeds the predetermined number of dirty lines after the data caching operation at step 250, an overflow is present. On the other hand, if the number of dirty lines does not exceed the predetermined number of dirty lines after the data caching operation at step 250, an overflow is absent.

The word "predetermined" as used herein with respect to a parameter, such as a predetermined number, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

When the overflow of the cache memory 110 occurs at step 250, the forced eviction operation of the dirty line may be performed at step 260. In the present embodiment, the forced eviction operation may be defined as an eviction which is performed when the total number of dirty lines in the cache memory 110 exceeds the predetermined number of dirty lines. The forced eviction operation may be performed for the LRU dirty line among the current dirty lines. Thus, the data stored in the LRU dirty line may be written into the memory through the forced eviction operation. After the forced eviction operation, the cache write operation may be performed to write the write data into the cache memory 110 at step 270. When there is a "write miss", the tag may also be changed. When there is no overflow of the cache memory 110 at step 250, that is, the total number of dirty lines does not exceed the predetermined number of dirty lines even though a dirty line is added by the data caching operation according to the "write miss", the cache write operation may be performed to write the write data into the cache memory 110 at step 270.

Next, when there is a "write hit", step 280 may determine whether the total number of dirty lines increased after the data caching operation. As described with reference to FIG. 4, when there is a "write hit", the total number of dirty lines might not be changed if the block of the cache memory 110, in which the write data have to be written, is a dirty line. In contrast, when there is a "write hit", the total number of dirty lines may increase by one if the block is not a dirty line. If the total number of dirty lines does not increase even after the data caching operation at step 280, the cache write operation may be performed to write the write data into the cache memory 110 at step 270. However, if the total number of dirty lines increases after the data caching operation at step 280, step 280 may determine whether there is an overflow of the cache memory 110. When there is an overflow of the cache memory 110 at step 250, the forced eviction operation of the dirty line may be performed at step 260. Thus, the data stored in the LRU dirty line may be written into the memory through the forced eviction operation. After the forced eviction operation, the cache write operation may be performed to write the write data into the cache memory 110 at step 270. When there is no overflow of the cache memory 110 at step 250, that is, the total number of dirty lines does not exceed the predetermined number of dirty lines even though a dirty line is added through the data caching operation according to the "write miss", the cache write operation may be performed to write the write data into the cache memory 110 at step 270.

Figure 7:
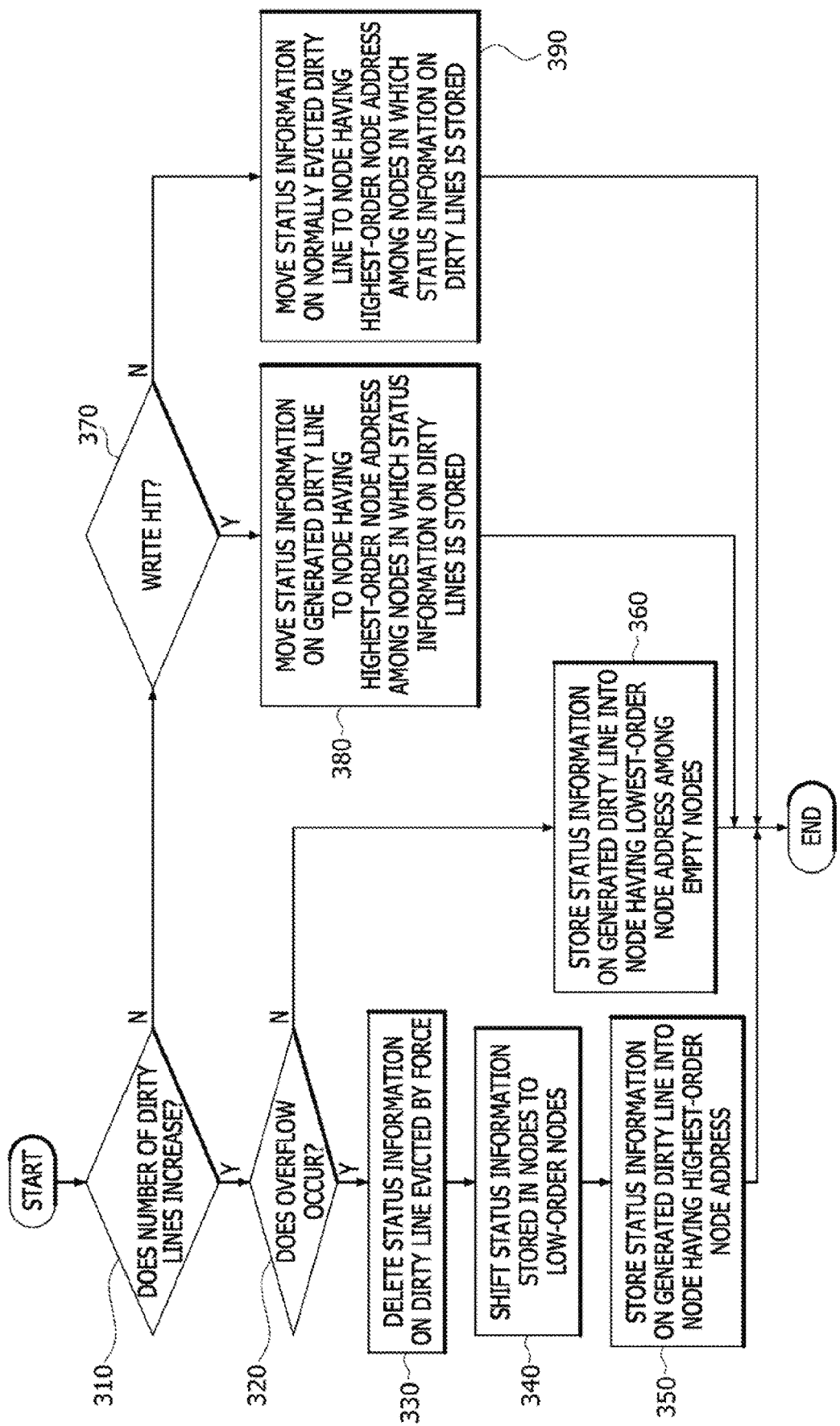
FIG. 7 is a flowchart, illustrating an operation of a dirty line list in a cache system, according to an embodiment of the present disclosure.

FIG. 7 is a flowchart, illustrating an operation of the dirty line list 130 in the cache system 100 according to an embodiment of the present disclosure. Referring to FIG. 7, step 310 may determine whether there is an increase in the number of dirty lines. That the number of dirty lines increases at step 310 may correspond to a case in which a target block of the cache memory 110, to which the cache write operation is applied, is not a dirty line. If the number of dirty lines increases at step 310, whether overflow occurs may be determined at step 320. That is, if the number of dirty lines increases due to the generation of a dirty line at step 310, the total number of dirty lines may exceed the number of the nodes in the dirty line list 130 to cause an overflow. The determination of whether the overflow occurs or not at step 320 may be executed based on dirty line list information data ('dirty line list info data' of FIG. 1) which are transmitted from the dirty line list 130 to the cache controller 120. If the overflow occurs, the forced eviction operation has to be performed to evict the LRU dirty line from the cache memory 110. If the overflow occurs at step 320, the status information of the dirty line, evicted by force, which is stored in the dirty line list 130, may be deleted (see step 330). Thereafter, the status information, stored in the nodes of the dirty line list 130, may be shifted to low-order nodes (see step 340). Status information of the generated dirty line may be stored into a node having a highest-order node address among nodes in the dirty line list 130 (see step 350). If no overflow occurs at step 320, the status information of the generated dirty line may be stored into a node having a lowest-order node address among empty nodes in the dirty line list 130 (see step 360).

If the number of dirty lines does not increase at step 310, it may be an indication that the dirty line that had already been stored in the target block of the cache memory 110 is not a dirty line. In addition, because the number of dirty lines does not increase, no overflow occurs. In such a case, whether the write data corresponds to a case of the "write hit" or the "write miss" may be determined (see step 370). When there is a "write hit" at step 370, it may be unnecessary to perform the normal eviction of the dirty line stored in the target block of the cache memory 110. At this time, the status information of the generated dirty line may be moved to a node having a highest-order node address among the nodes in which the status information of the dirty lines is stored (see step 380). By this movement of the status information, the status information of the dirty lines stored in the nodes may be sequentially shifted to their immediately lower-order nodes, from the node in which the status information of the generated dirty line is moved and stored to the node having status information to be moved and deleted. When there is a "write miss" at step 370, the normal eviction of the dirty line stored in the target block of the cache memory 110 has to be performed. In such a case, the status information of a dirty line normally evicted may be moved to a node having a highest-order node address among the nodes in which the status information of the dirty lines is stored (see step 390). Even in this case, the status information of the dirty lines stored in the nodes may be sequentially shifted to their immediately lower-order nodes, from the node in which the status information of the dirty line normally evicted is moved and stored to the node having status information to be moved and deleted.

Hereinafter, the operation of the dirty line list 130 illustrated in FIG. 7 will be described more fully in conjunction with various examples. In the following examples, a value of the valid bit in the cache memory 110 and a value of the way in the dirty line list 130 are not indicated.

Figure 8:
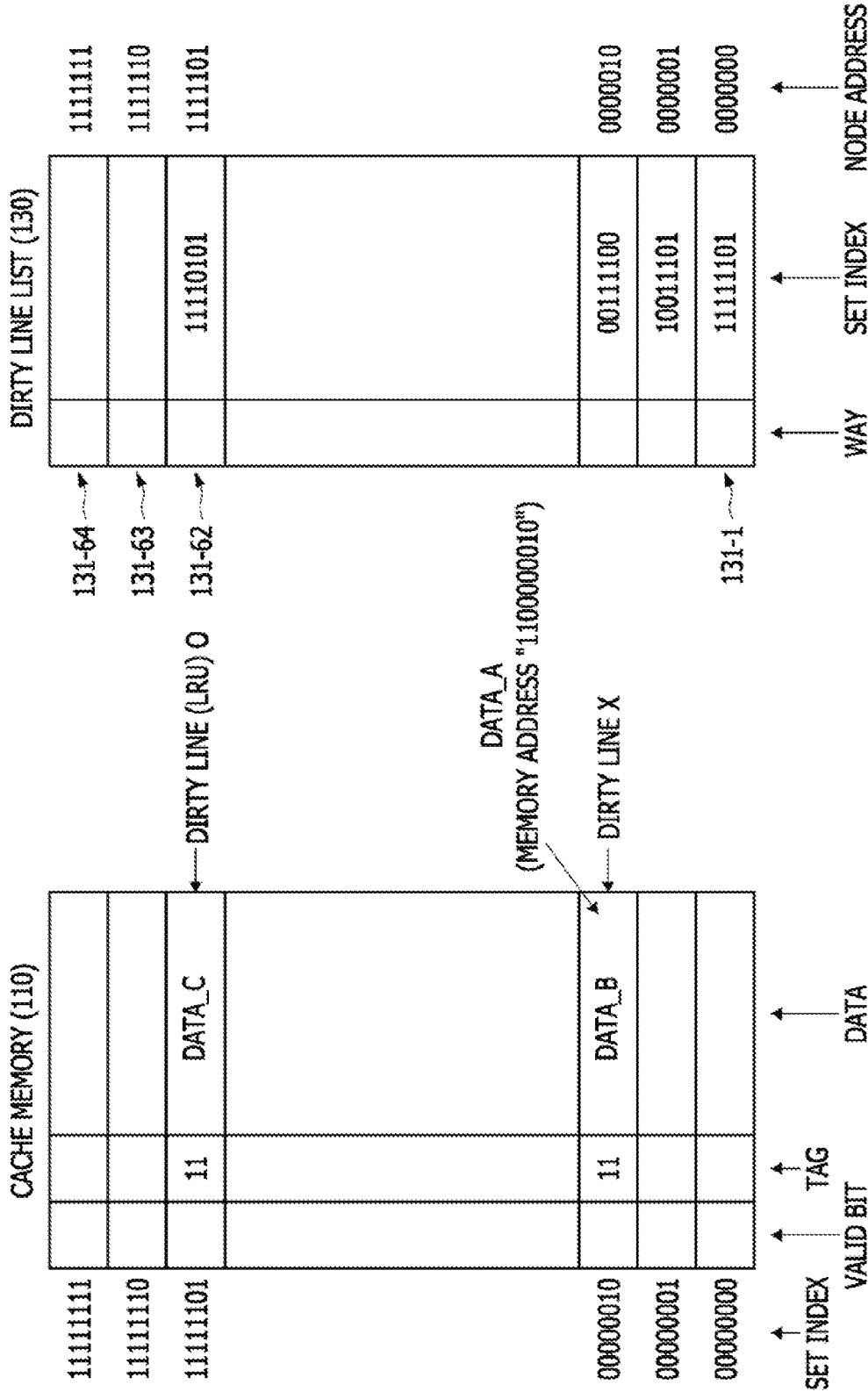
FIGS. 8 to 10 illustrate a process of controlling a dirty line list when the number of dirty lines increases and no overflow occurs with "write hit" in a cache system, according to an embodiment of the present disclosure.
Figure 9:
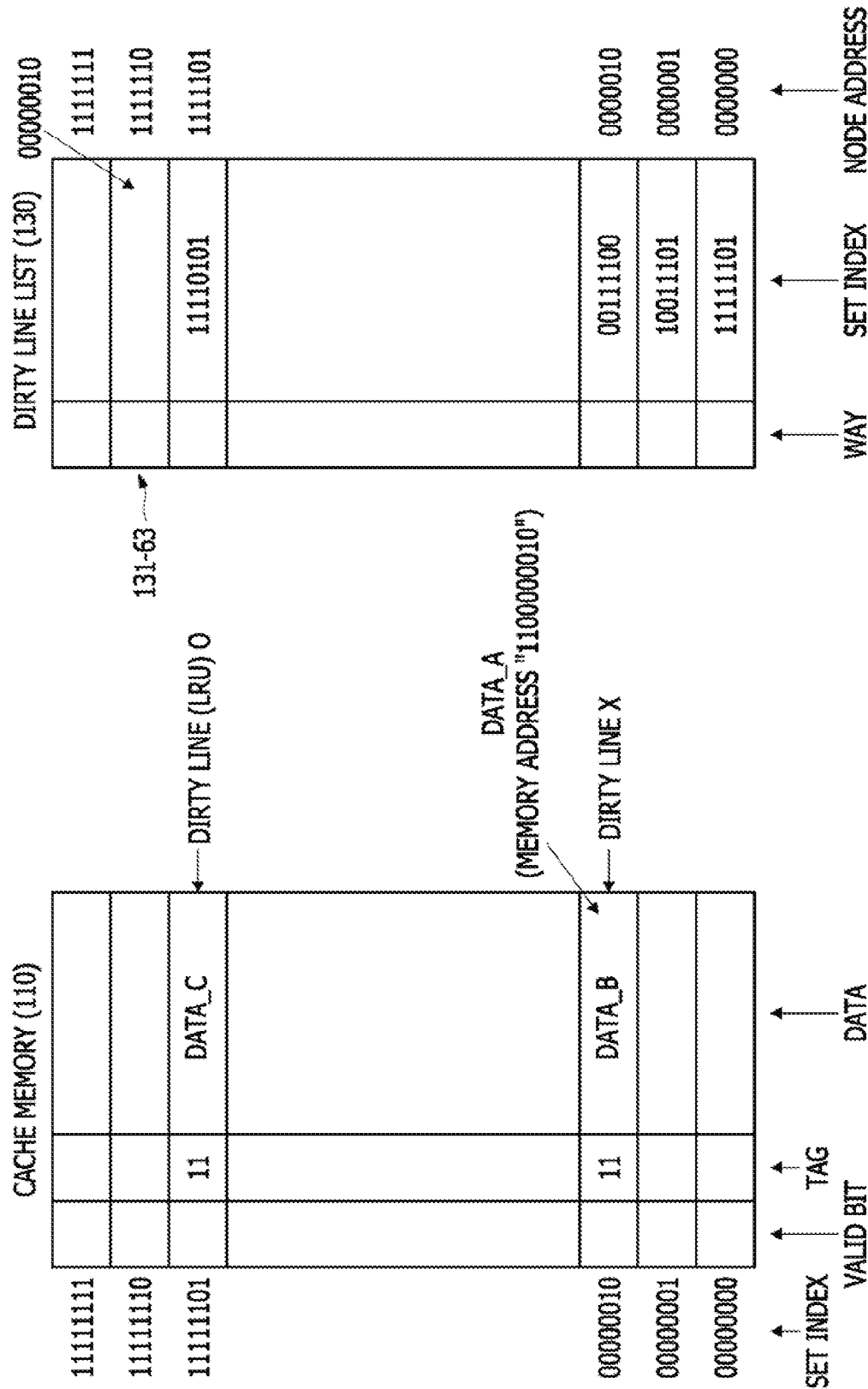
Figure 10:
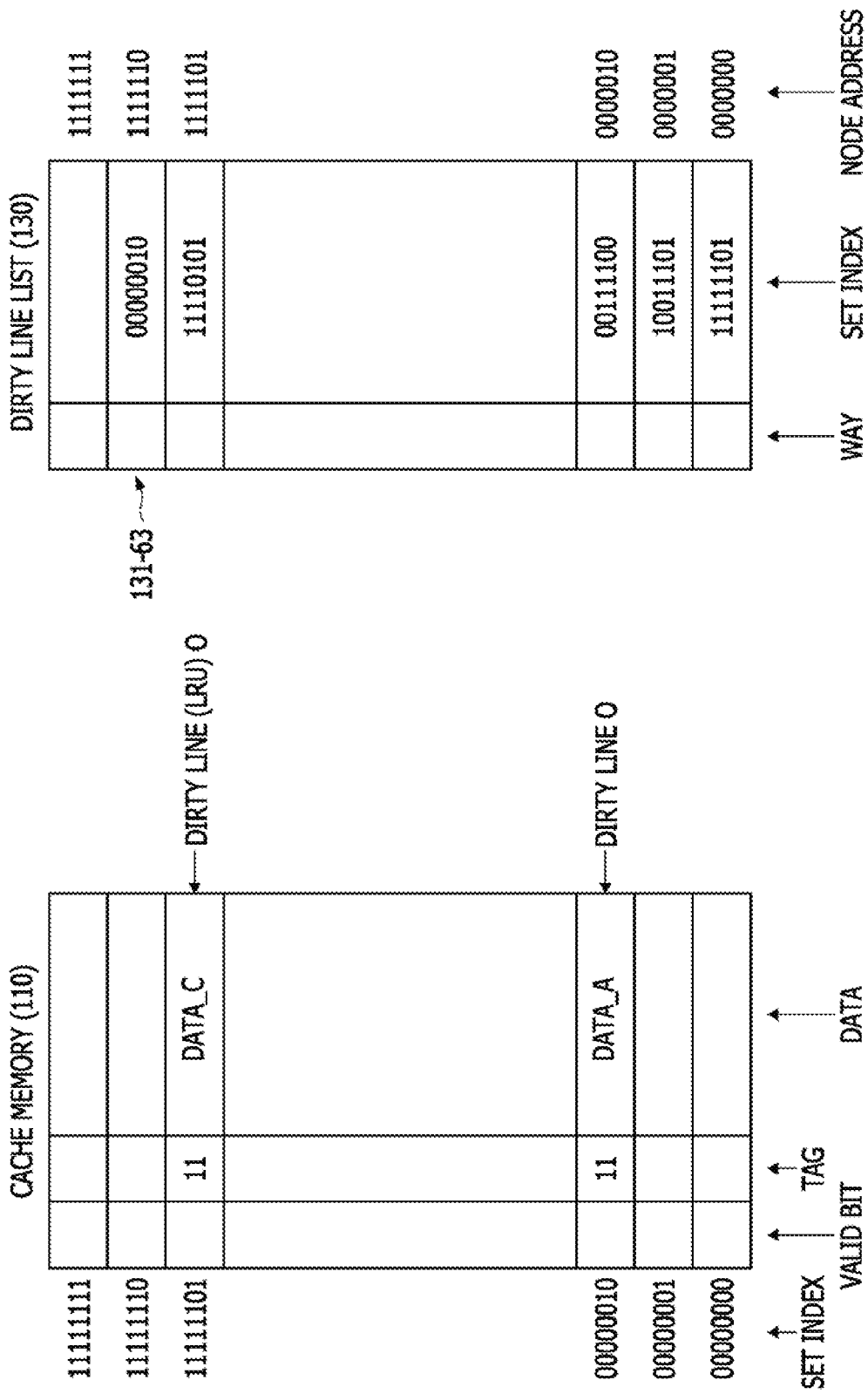

FIGS. 8 to 10 illustrate a process of controlling the dirty line list 130 when the number of dirty lines increases and no overflow occurs, based on a "write hit" in the cache system 100, according to an embodiment of the present disclosure. First, as illustrated in FIG. 8, the tag of '11' and the data DATA_B may be stored in a block having a set index of '00000010' in the cache memory 110, and the tag of '11' and the data DATA_C may be stored in a block having a set index of '11111101' in the cache memory 110. In the present embodiment, it may be assumed that the block storing the data DATA_B is not a dirty line. That is, it may be assumed that the data DATA_B is stored in a region of the memory having a memory address of '1100000010'. In addition, it may be assumed that the block, storing the data DATA_C, is a dirty line, particularly, an LRU dirty line. Moreover, set indexes may be stored in the nodes of the dirty line list 130, disposed from the lowest-order node 131-1, having a lowest-order node address of '0000000,' to the node 131-62, having a node address of '1111101', respectively. A set index '11111101' of the LRU dirty line may be stored in the node 131-1, having a lowest-order node address of '0000000' in the dirty line list 130. The node 131-63 (i.e., the second highest-order node), having a node address of '1111110,' and the highest-order node 131-64, having a node address of '1111111,' may be empty to avoid an overflow. In this status, if a write request for writing the data DATA_A into a region of the memory, having a memory address of '1100000010,' occurs, the cache write operation may be performed to store the tag '11' and the data DATA_A into the block of the cache memory 110 having a set index of '00000010'.

The above example may correspond to a case in which the number of dirty lines increases at step 310 of FIG. 7 and no overflow occurs at step 320 of FIG. 7, as described with reference to the flowchart of FIG. 7. Thus, the status information of the generated dirty line may be stored into the node having a lowest-order node address among the empty nodes (see step 360 of FIG. 7). Specifically, as illustrated in FIG. 9, the tag '11' and the data DATA_A may be stored in the block, having a set index of '00000010', and the set index '00000010' of the generated dirty line may be stored in the node 131-63, having a lowest-order node address (i.e., the node address of '1111110'), among the empty nodes of the dirty line list 130. Thus, as illustrated in FIG. 10, the block, having a set index of '00000010' in the cache memory 110, and, storing the tag '11' and the data DATA_A with the cache write operation, may become a dirty line even though the block having a set index of '00000010' is not a dirty line prior to the cache write operation. In particular, the block having a set index of '00000010' in the cache memory 110 may become an MRU dirty line.

Figure 11:
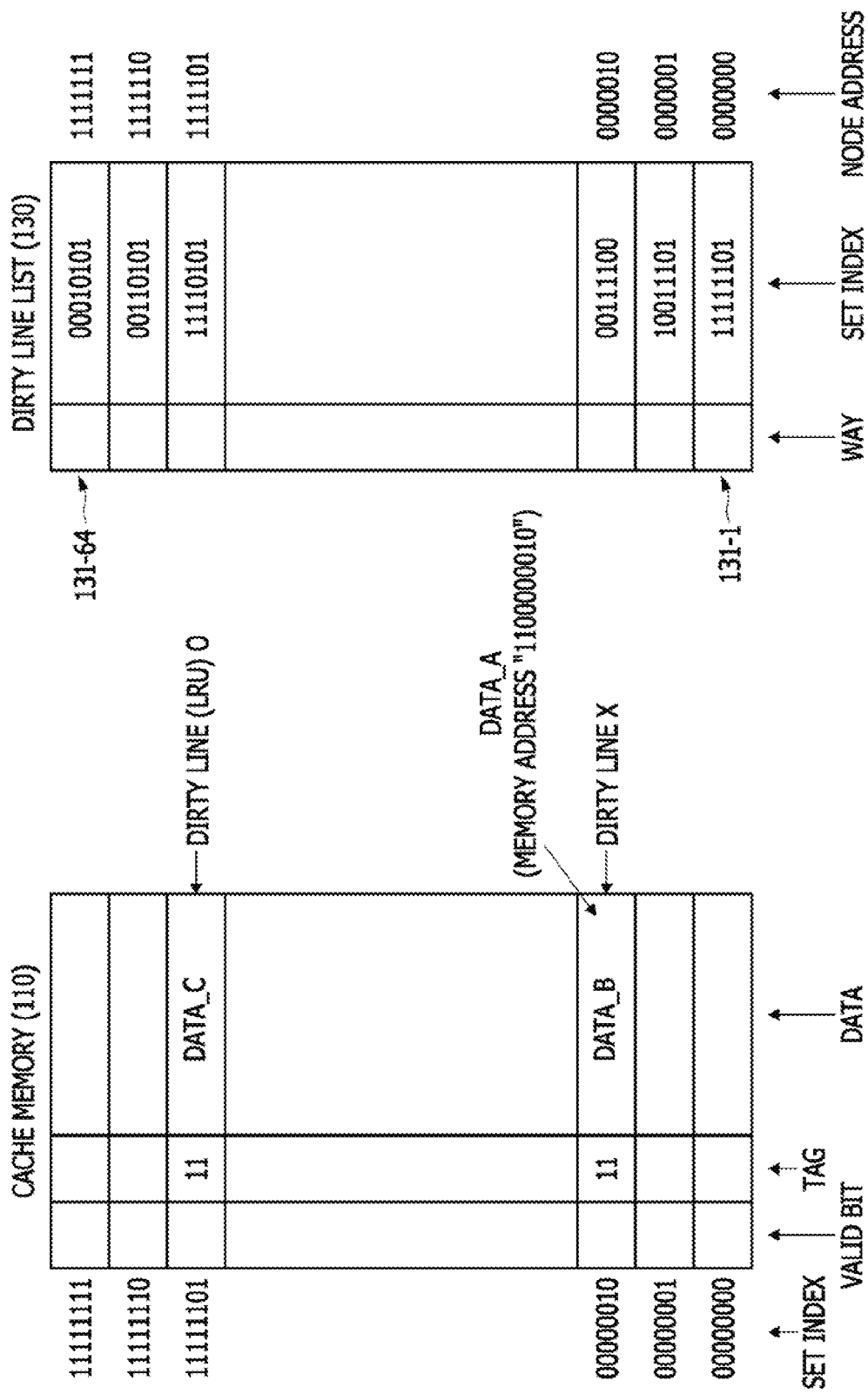
FIGS. 11 to 13 illustrate a process of controlling a dirty line list when the number of dirty lines increases and overflow occurs with "write hit" in a cache system, according to an embodiment of the present disclosure.
Figure 12:
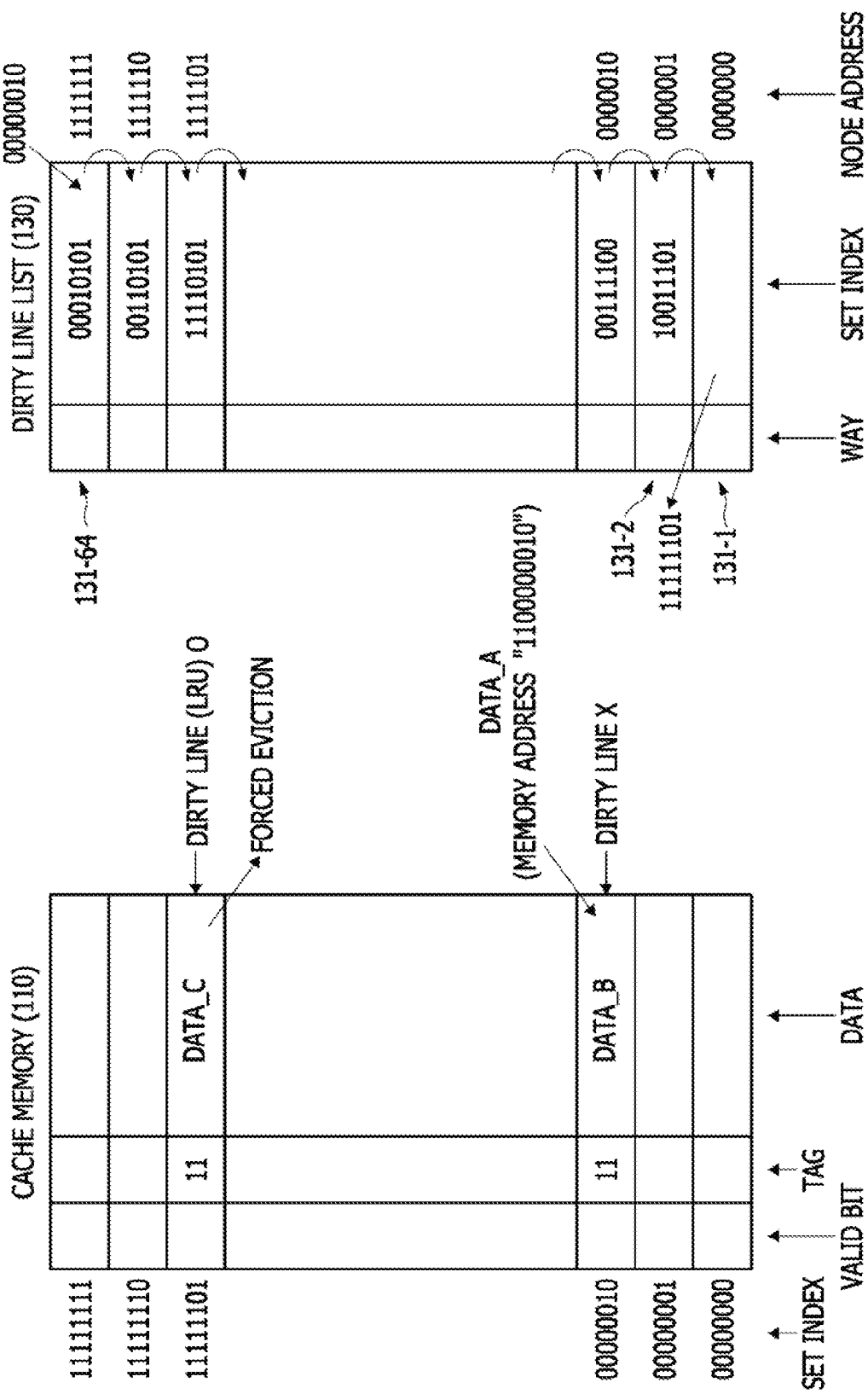
Figure 13:
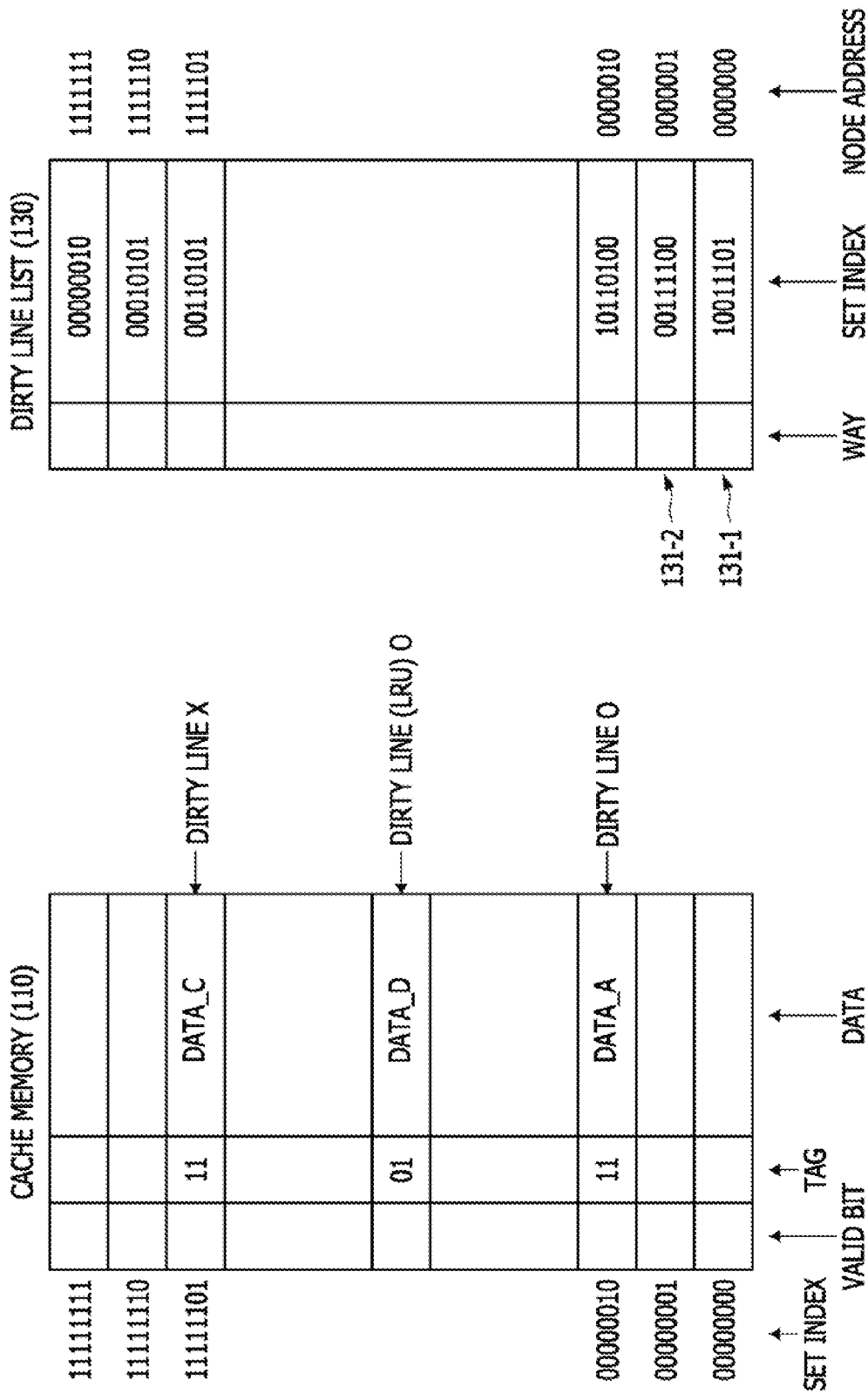

FIGS. 11 to 13 illustrate a process of controlling the dirty line list 130 when the number of dirty lines increases and the overflow occurs, based on a "write hit" in the cache system 100 according to an embodiment of the present disclosure. First, as illustrated in FIG. 11, the tag of '11' and the data DATA_B may be stored in the block having a set index of '00000010' in the cache memory 110, and the tag of '11' and the data DATA_C may be stored in the block having a set index of '11111101' in the cache memory 110. In the present embodiment, it may be assumed that the block storing the data DATA_B is not a dirty line. That is, it may be assumed that the data DATA_B is stored in a region of the memory having a memory address of '1100000010'. In addition, it may be assumed that the block storing the data DATA_C is a dirty line, particularly, an LRU dirty line. Moreover, set indexes may be stored in all of the nodes of the dirty line list 130, disposed from the lowest-order node 131-1, having a lowest-order node address of '0000000,' to the highest-order node 131-64, having a highest-order node address of '1111111', respectively. A set index '11111101' of the LRU dirty line may be stored in the node 131-1, having a lowest-order node address of '0000000,' in the dirty line list 130. A set index '00010101' of the MRU dirty line may be stored in the node 131-64, having a highest-order node address of '1111111,' in the dirty line list 130. In this status, if a write request for writing the data DATA_A into a region of the memory having a memory address of '1100000010' occurs, the cache write operation may be performed to store the tag '11' and the data DATA_A into the block of the cache memory 110 having a set index of '00000010'.

The above example may correspond to a case in which the number of dirty lines increases at step 310 of FIG. 7 and the overflow occurs at step 320 of FIG. 7, as described with reference to the flowchart of FIG. 7. Accordingly, steps 330 to 350 of FIG. 7 may be executed. Specifically, as illustrated in FIG. 12, the LRU dirty line, having a set index of '11111101,' may be evicted by force. Accordingly, the data DATA_C may be stored into a region of the memory, having a memory address of '1111111101'. The status information of the LRU dirty line, stored in the node 131-1, having a node address of '0000000', that is, the set index '11111101' in the node 131-1, may be deleted. Subsequently, as indicated by arrows between the nodes of FIG. 12, the status information in the nodes may be shifted to their immediately lower-order nodes. Thereafter, the status information (i.e., the set index '00000010') of the dirty line, newly generated by writing the data DATA_A, may be stored into the node 131-64, having a highest-order node address of '1111111,' in the dirty line list 130. Thus, as illustrated in FIG. 13, the tag '11' and the data DATA_A may be stored in the block of the cache memory 110, having a set index of '00000010', and the block, storing the data DATA_A in the cache memory 110, may become the MRU dirty line. The block, having a set index of '11111101' in the cache memory 110, might not be regarded as a dirty line. The set index '10011101' stored in the node 131-2, having a node address of '0000001,' may be shifted and stored into the node 131-1, having a lowest-order node address of '0000000'. Thus, the block storing data DATA_D, having a set index of '10011101' in the cache memory 110, may become the LRU dirty line.

Figure 14:
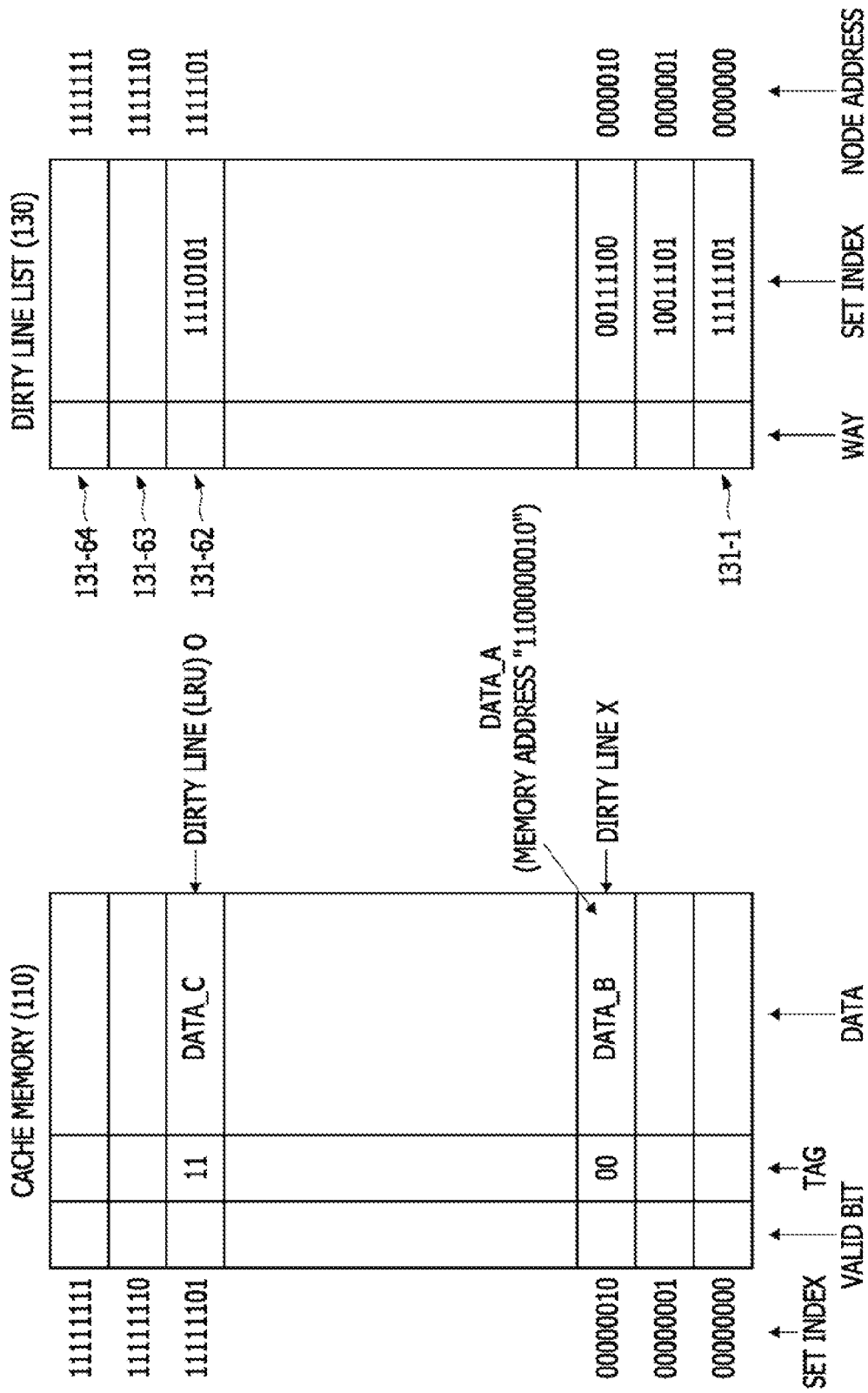
FIGS. 14 to 16 illustrate a process of controlling a dirty line list when the number of dirty lines increases and no overflow occurs with "write miss" in a cache system, according to an embodiment of the present disclosure.
Figure 15:
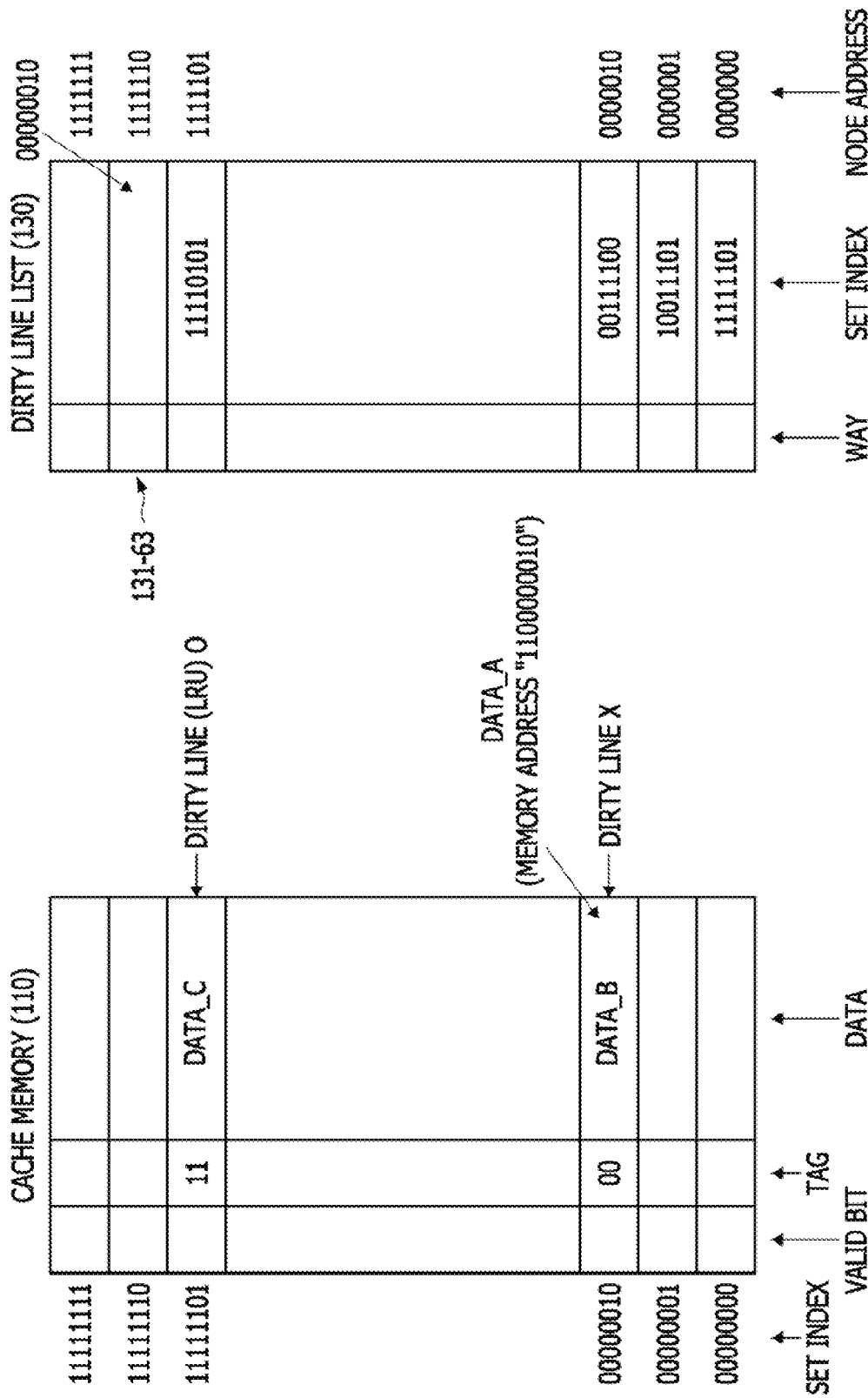
Figure 16:
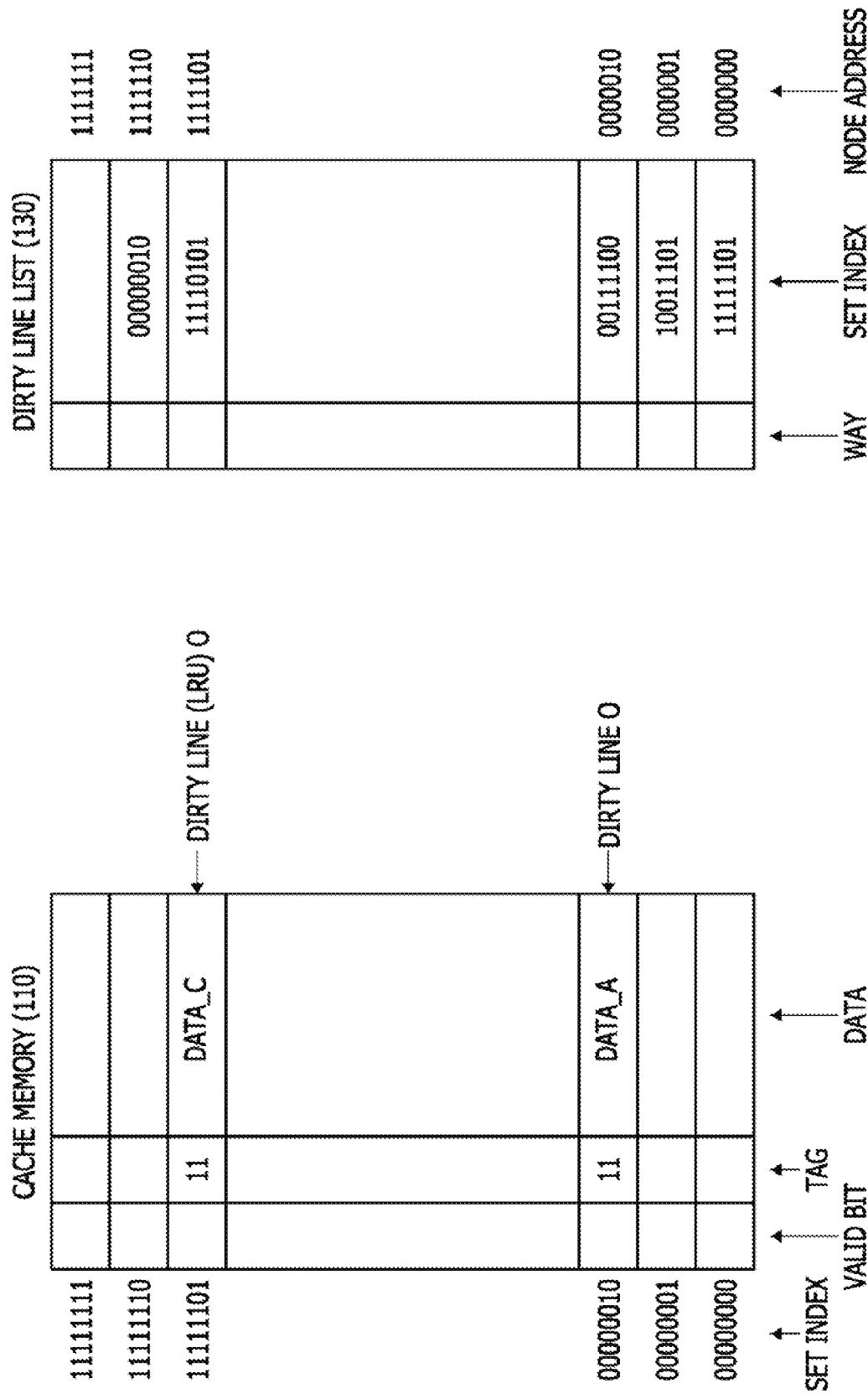

FIGS. 14 to 16 illustrate a process of controlling the dirty line list 130 when the number of dirty lines increases and no overflow occurs, based on a "write miss" in the cache system 100, according to an embodiment of the present disclosure. First, as illustrated in FIG. 14, the tag of '00' and the data DATA_B may be stored in the block, having a set index of '00000010' in the cache memory 110. Furthermore, the tag of '11' and the data DATA_C may be stored in the block, having a set index of '11111101' in the cache memory 110. In the present embodiment, it may be assumed that the block storing the data DATA_B is not a dirty line. That is, it may be assumed that the data DATA_B is stored in a region of the memory having a memory address of '0000000010'. In addition, it may be assumed that the block storing the data DATA_C is a dirty line, particularly, an LRU dirty line. Moreover, set indexes may be stored in the nodes of the dirty line list 130, disposed from the lowest-order node 131-1, having a lowest-order node address of '0000000,' to the node 131-62, having a node address of '1111101', respectively. A set index '11111101' of the LRU dirty line may be stored in the node 131-1, having a lowest-order node address of '0000000' in the dirty line list 130. The node 131-63 (i.e., the second highest-order node), having a node address of '1111110,' and the highest-order node 131-64, having a node address of '1111111,' may be empty to avoid an overflow. In this status, if a write request, for writing the data DATA_A into a region of the memory having a memory address of '1100000010,' occurs, the cache write operation may be performed to store the tag '11' and the data DATA_A into the block of the cache memory 110, having a set index of '00000010'.

The above example may correspond to a case in which the number of dirty lines increases at step 310 of FIG. 7, and no overflow occurs at step 320 of FIG. 7, as described with reference to the flowchart of FIG. 7. Thus, the status information of the generated dirty line may be stored into the node having a lowest-order node address, among the empty nodes (see step 360 of FIG. 7). Specifically, as illustrated in FIGS. 15 and 16, the tag '11' and the data DATA_A may be stored in the block, having a set index of '00000010', and the set index '00000010' of the newly generated dirty line may be stored in the node 131-63, having a lowest-order node address (i.e., the node address of '1111110') among the empty nodes of the dirty line list 130. Thus, the block, having a set index of '00000010,' in the cache memory 110, and storing the tag '11' and the data DATA_A with the cache write operation, may become a dirty line even though the block having a set index of '00000010' is not a dirty line before the cache write operation. In particular, the block, having a set index of '00000010' in the cache memory 110, may become an MRU dirty line.

Figure 17:
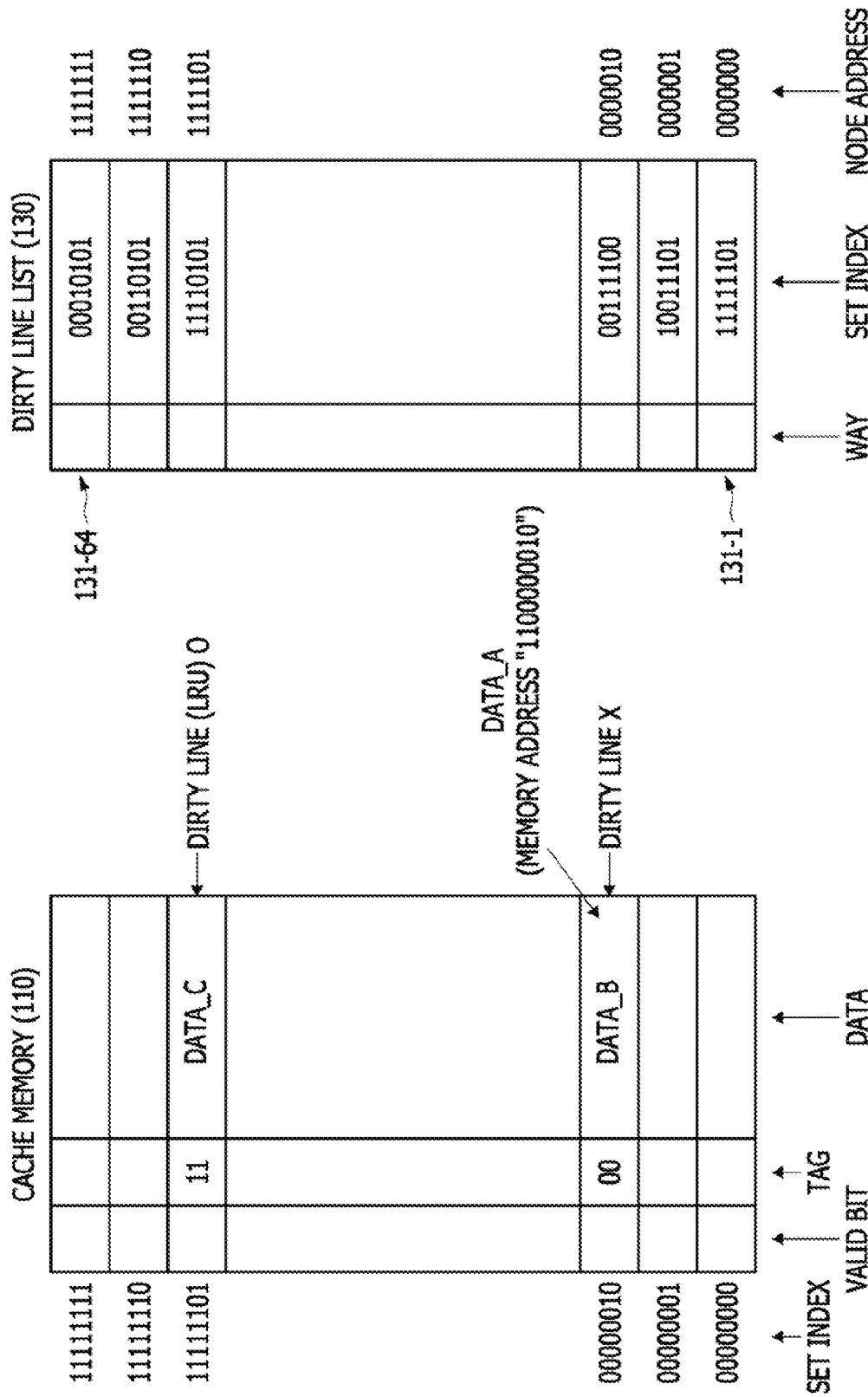
FIGS. 17 to 19 illustrate a process of controlling a dirty line list when the number of dirty lines increases and overflow occurs with "write miss" in a cache system, according to an embodiment of the present disclosure.
Figure 18:
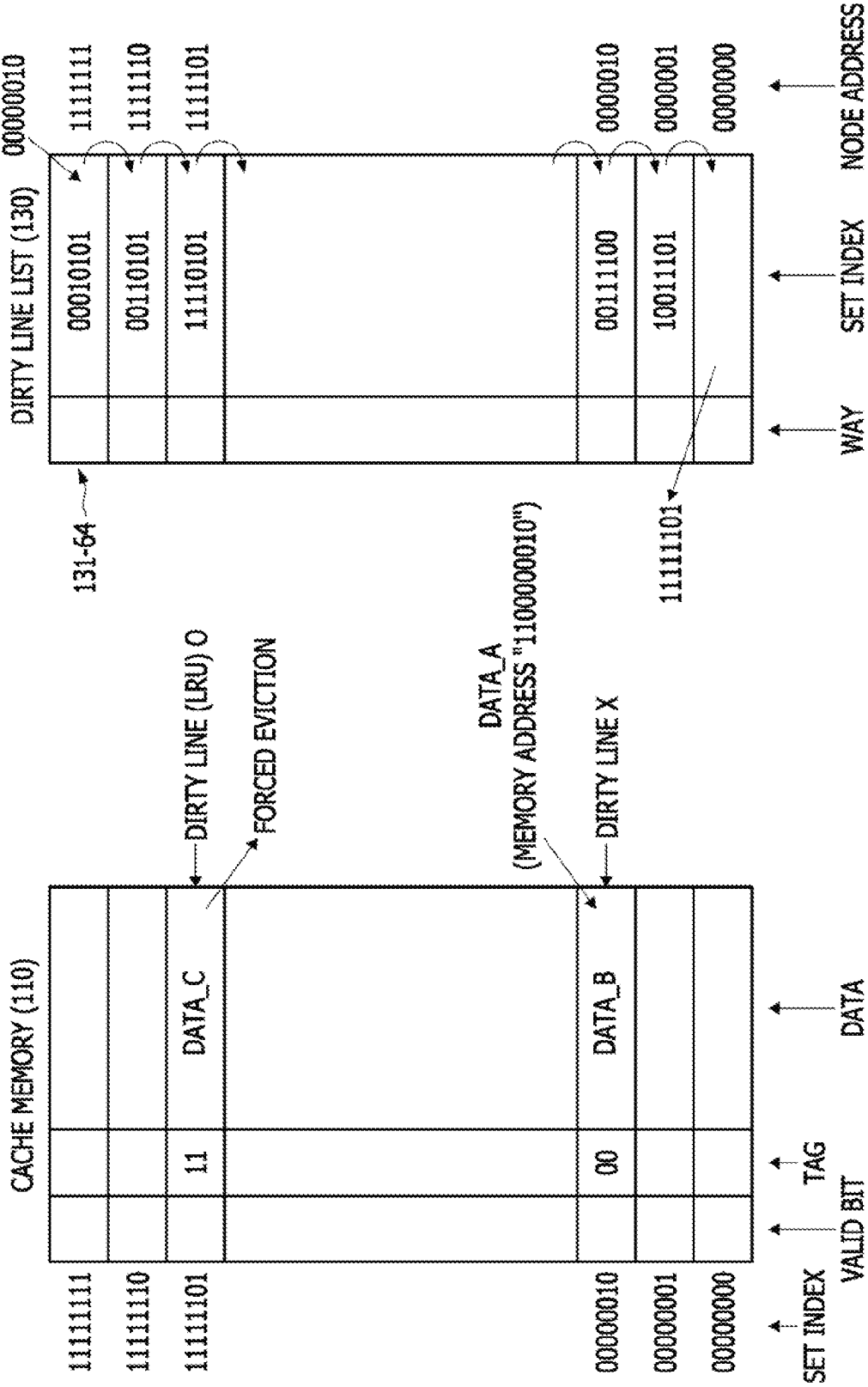
Figure 19:
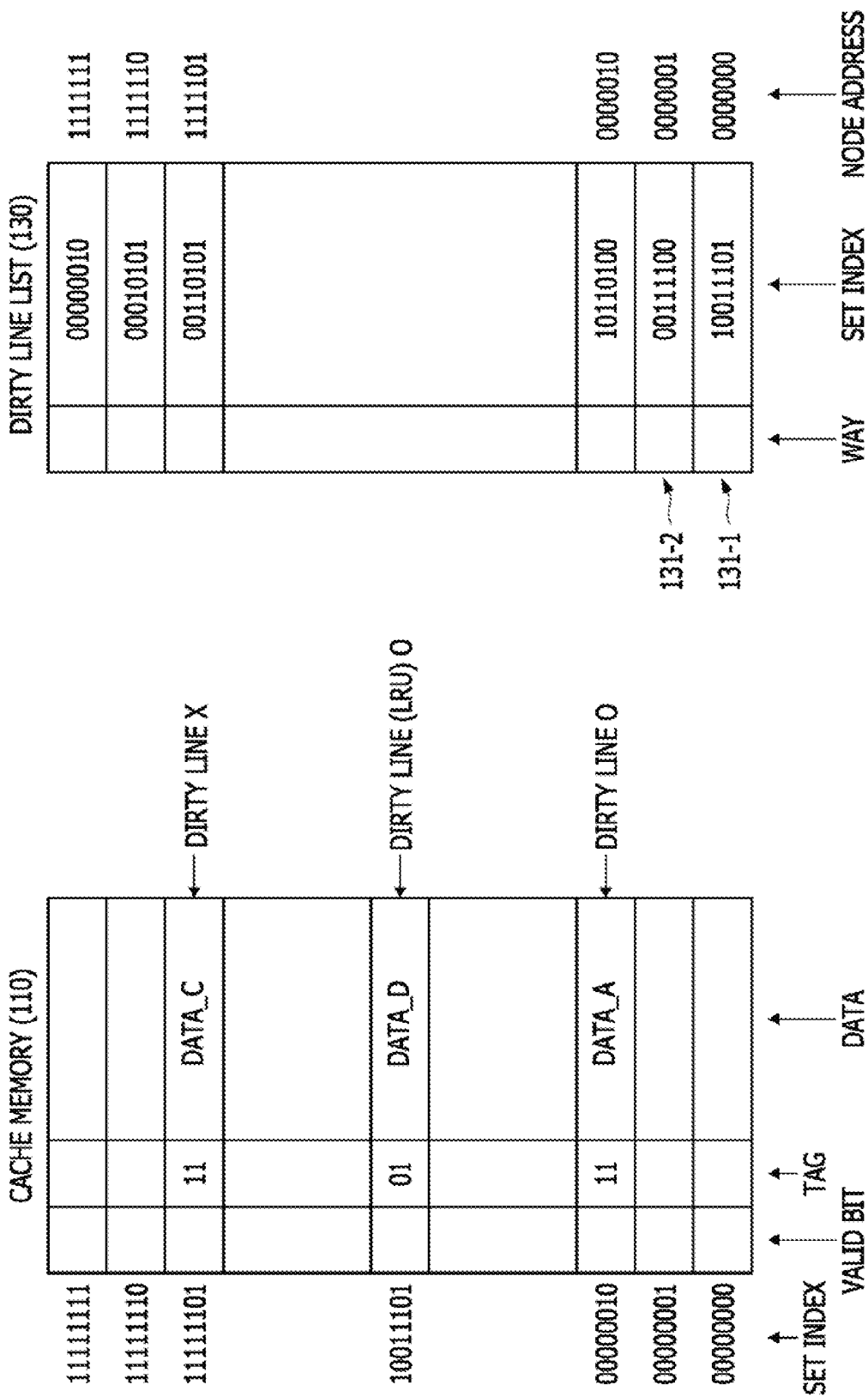

FIGS. 17 to 19 illustrate a process of controlling the dirty line list 130 when the number of dirty lines increases and the overflow occurs, based on a "write miss" in the cache system 100, according to an embodiment of the present disclosure. First, as illustrated in FIG. 17, the tag of '00' and the data DATA_B may be stored in the block, having a set index of '00000010' in the cache memory 110, and the tag of '11' and the data DATA_C may be stored in the block, having a set index of '11111101' in the cache memory 110. In the present embodiment, it may be assumed that the block, storing the data DATA_B, is not a dirty line. That is, it may be assumed that the data DATA_B is stored in a region of the memory, having a memory address of '0000000010'. In addition, it may be assumed that the block, storing the data DATA_C, is a dirty line, particularly, an LRU dirty line. Moreover, set indexes may be stored in all of the nodes of the dirty line list 130, disposed from the lowest-order node 131-1, having a lowest-order node address of '0000000,' to the highest-order node 131-64, having a highest-order node address of '1111111', respectively. A set index '11111101' of the LRU dirty line may be stored in the node 131-1, having a lowest-order node address of '0000000,' in the dirty line list 130. A set index '00010101' of the MRU dirty line may be stored in the node 131-64, having a highest-order node address of '11111111,' in the dirty line list 130. In this status, if a write request for writing the data DATA_A into a region of the memory, having a memory address of '1100000010,' occurs, the cache write operation may be performed to store the tag '11' and the data DATA_A into the block of the cache memory 110, having a set index of '00000010'.

The above example may correspond to a case in which the number of dirty lines increases at step 310 of FIG. 7 and the overflow occurs at step 320 of FIG. 7, as described with reference to the flowchart of FIG. 7. Accordingly, steps 330 to 350 of FIG. 7 may be executed. Specifically, as illustrated in FIG. 18, the LRU dirty line, having a set index of '11111101,' may be evicted by force. Thus, the data DATA_C may be stored into a region of the memory, having a memory address of '1111111101'. The status information of the LRU dirty line stored in the node 131-1, having a node address of '0000000', that is, the set index '11111101' in the node 131-1, may be deleted. Subsequently, as indicated by arrows between the nodes of FIG. 18, the status information in the nodes may be shifted to their immediately lower-order nodes. Thereafter, the status information (i.e., the set index '00000010') of a dirty line, newly generated by writing the data DATA_A, may be stored into the node 131-64, having a highest-order node address of '1111111,' in the dirty line list 130. Thus, as illustrated in FIG. 19, the tag '11' and the data DATA_A may be stored in the block of the cache memory 110, having a set index of '00000010', and the block storing the data DATA_A in the cache memory 110 may become the MRU dirty line. The block, having a set index of '11111101' in the cache memory 110, might not be regarded as a dirty line. The set index '10011101,' stored in the node 131-2, having a node address of '0000001,' may be shifted and stored into the node 131-1, having a lowest-order node address of '0000000'. Thus, the block, storing data DATA_D and having a set index of '10011101' in the cache memory 110, may become the LRU dirty line.

Figure 20:
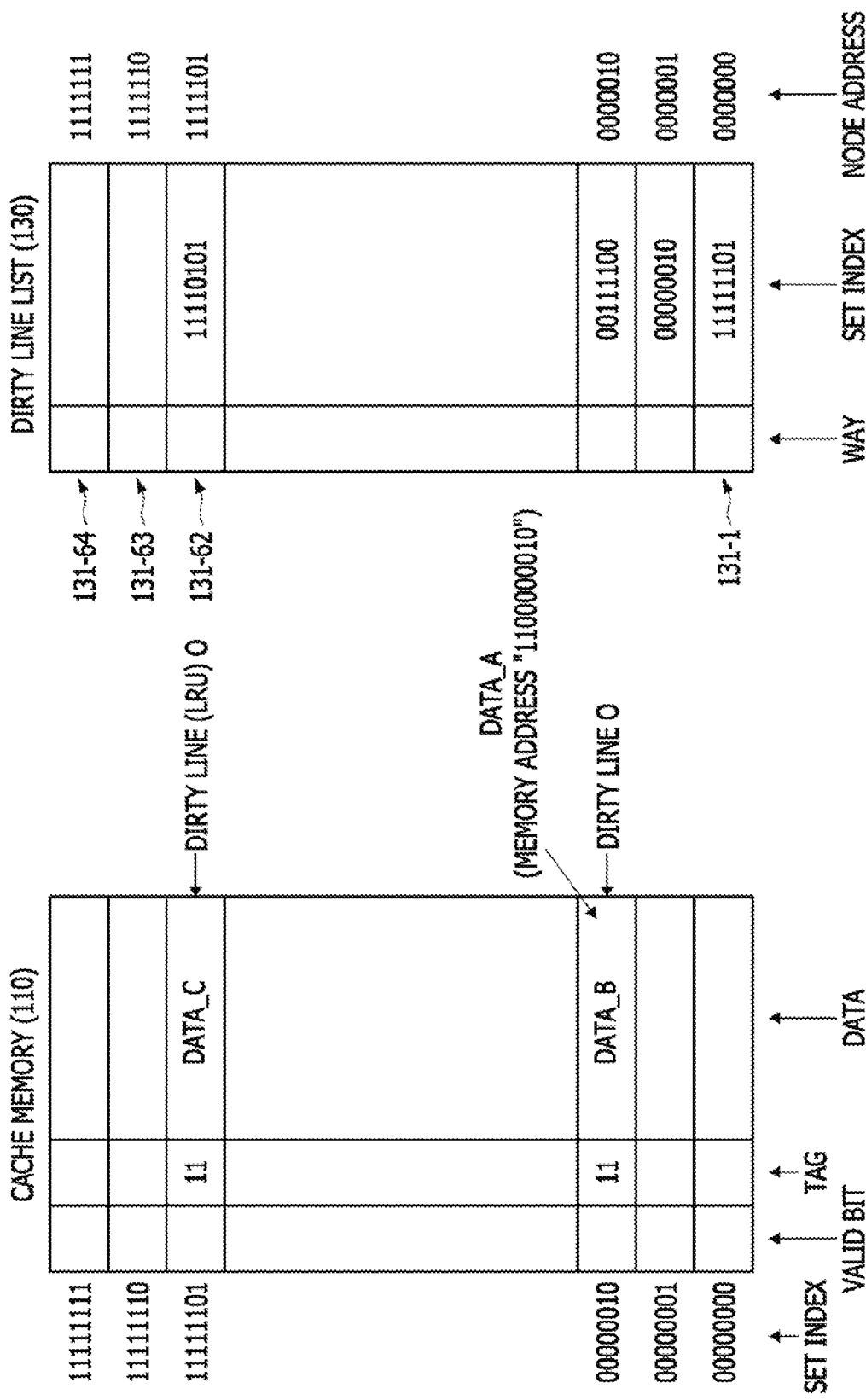
FIGS. 20 to 22 illustrate a process of controlling a dirty line list when the number of dirty lines does not increase and no overflow occurs with "write hit" in a cache system, according to an embodiment of the present disclosure.
Figure 21:
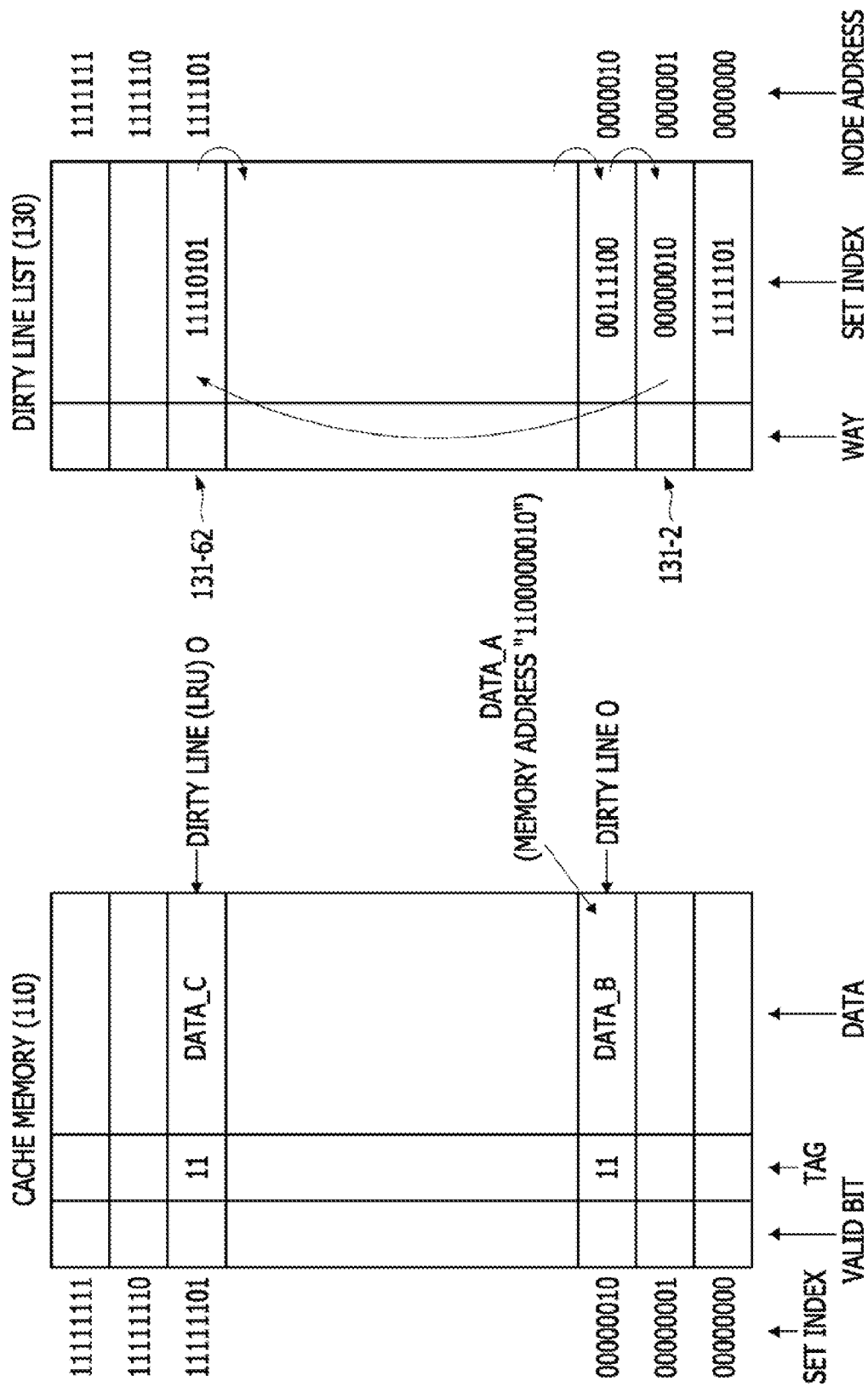
Figure 22:
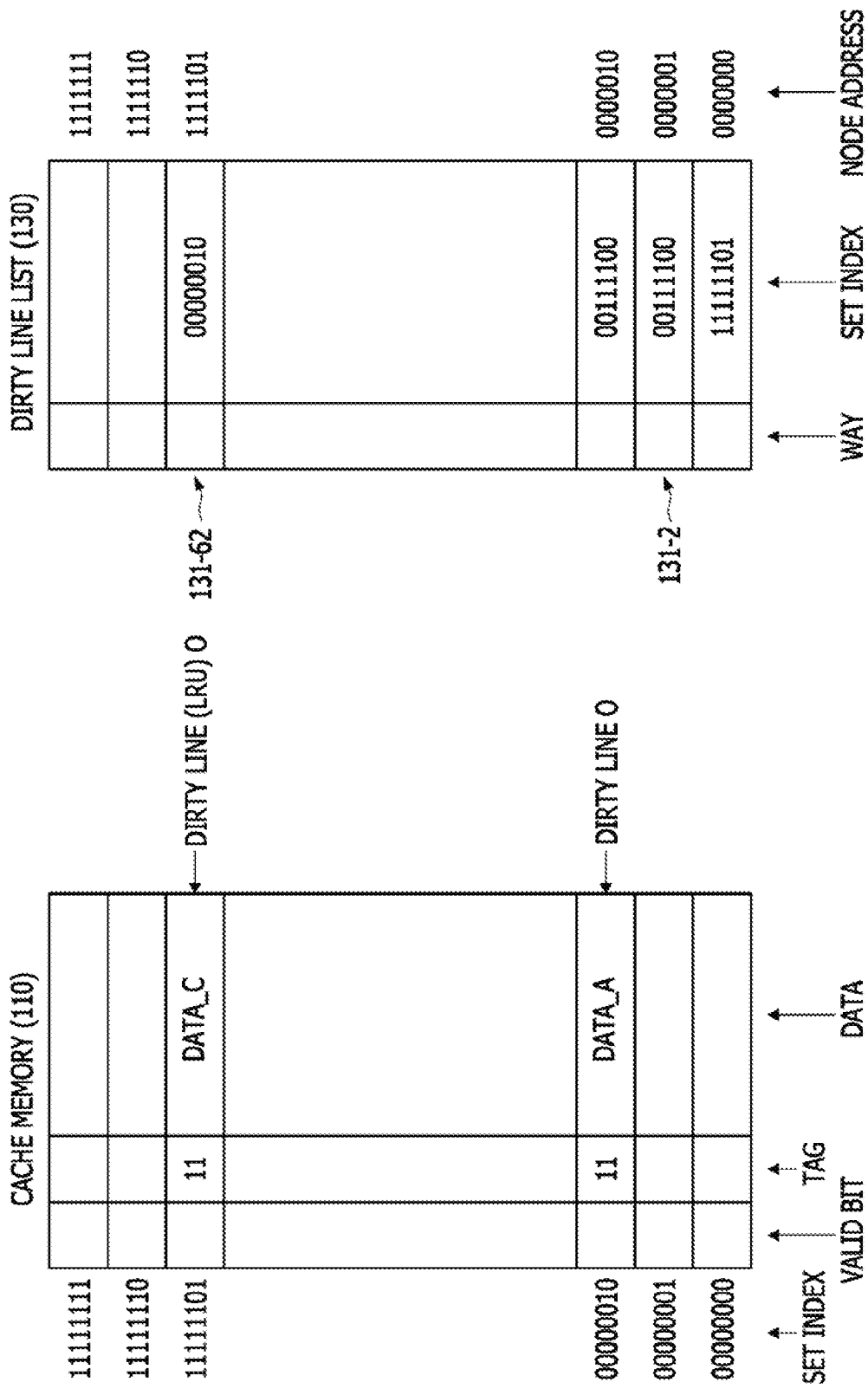

FIGS. 20 to 22 illustrate a process of controlling the dirty line list 130 when the number of dirty lines does not increase and no overflow occurs, based on a "write hit" in the cache system 100, according to an embodiment of the present disclosure. First, as illustrated in FIG. 20, the tag of '11' and the data DATA_B may be stored in a block, having a set index of '00000010' in the cache memory 110, and the tag of '11' and the data DATA_C may be stored in a block, having a set index of '11111101' in the cache memory 110. In the present embodiment, it may be assumed that the block storing the data DATA_B is a dirty line. That is, it may be assumed that the data DATA_B has not yet been written in a region of the memory, having a memory address of '1100000010'. In addition, it may be assumed that the block storing the data DATA_C is a dirty line, particularly, an LRU dirty line. Moreover, set indexes may be stored in the nodes of the dirty line list 130, disposed from the lowest-order node 131-1, having a lowest-order node address of '0000000,' to the node 131-62, having a node address of '1111101', respectively. A set index '11111101' of the LRU dirty line may be stored in the node 131-1, having a lowest-order node address of '0000000,' in the dirty line list 130. The node 131-63 (i.e., the second highest-order node), having a node address of '1111110,' and the highest-order node 131-64, having a node address of '1111111,' may be empty to avoid an overflow. In this status, if a write request for writing the data DATA_A into a region of the memory, having a memory address of '1100000010,' occurs, the cache write operation may be performed to store the tag '11' and the data DATA_A into the block of the cache memory 110, having a set index of '00000010'.

The above example may correspond to a case in which the number of dirty lines does not increase at step 310 of FIG. 7 and the data DATA_A is regarded as a "write hit" at step 370 of FIG. 7, as described with reference to the flowchart of FIG. 7. Thus, the status information of the newly generated dirty line may be moved to the node, having a highest-order node address among the nodes, in which the status information of the dirty lines is stored (see step 380 of FIG. 7). Specifically, as illustrated in FIG. 21, the set index '00000010' of the newly generated dirty line, stored in the node 131-2, having a node address of '0000001,' may be moved to the node (i.e., the node 131-62), having a highest-order node address among the nodes having the status information of the dirty lines. As the set index '00000010,' stored in the node 131-2, is moved to the node 131-62, having a node address of '1111101', the set index '11110101,' originally stored in the node 131-62, having a node address of '1111101,' may be shifted to its immediately lower-order node. This shift of the set index may be sequentially executed until the node 131-2, which becomes empty due to the movement of the set index '00000010' of the newly generated dirty line, is filled with the set index '00111100,' originally stored in the node 131-3, as indicated by arrows between the nodes of FIG. 21. Because the block having a set index of '00000010' in the cache memory 110 was a second LRU dirty line before the cache write operation, the status information (i.e., the set index '00000010') of the block was originally stored in the node 131-2 of the dirty line list 130. However, as illustrated in FIG. 22, the block, having a set index of '00000010' in the cache memory 110, may become an MRU dirty line after the cache write operation, and the status information (i.e., the set index '00000010') of the block may be stored into the node 131-62, having a highest-order node address among the nodes, filled with the status information of the dirty lines.

Figure 23:
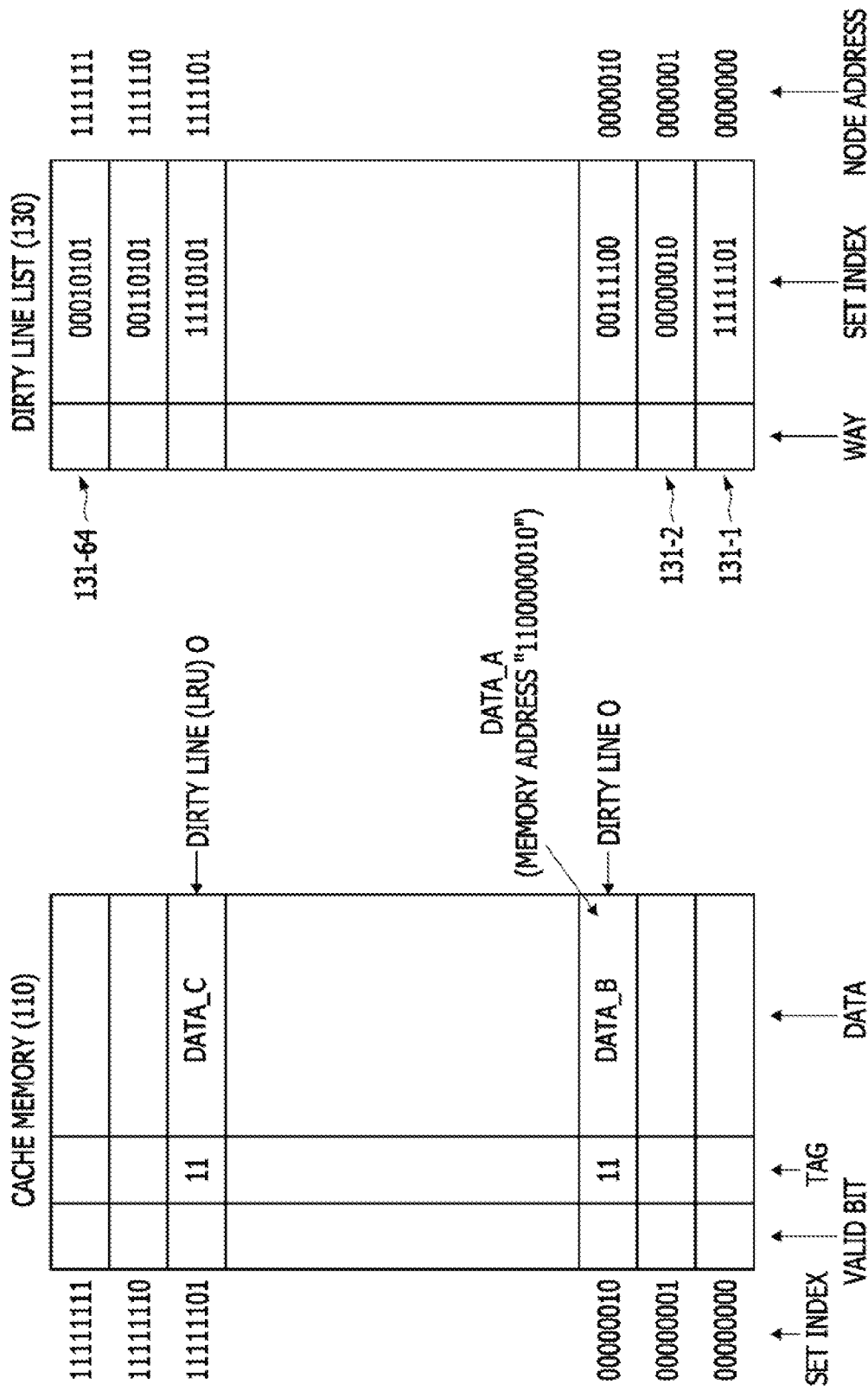
FIGS. 23 to 25 illustrate a process of controlling a dirty line list when the number of dirty lines does not increase and overflow occurs with "write hit" in a cache system, according to an embodiment of the present disclosure.
Figure 24:
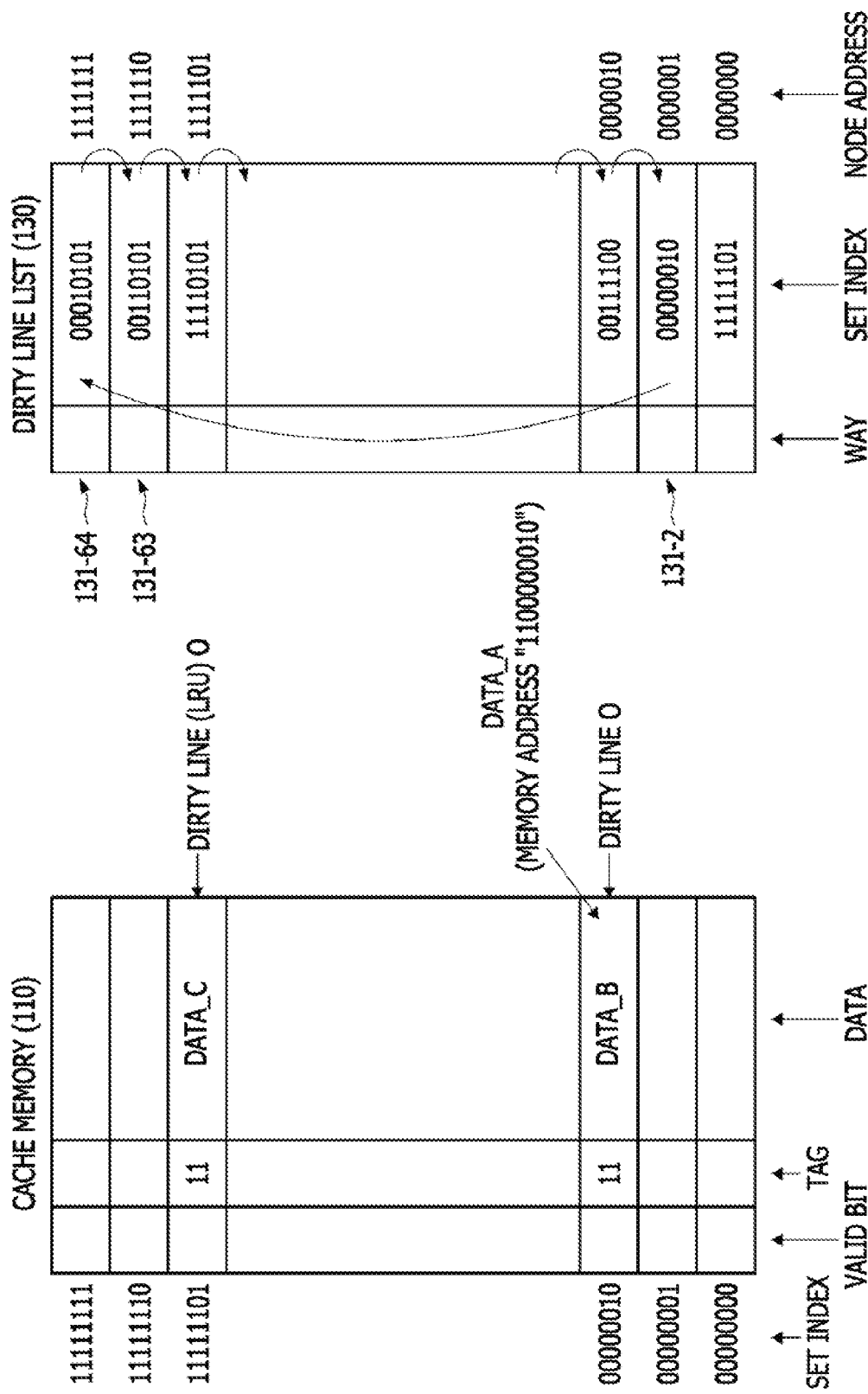
Figure 25:
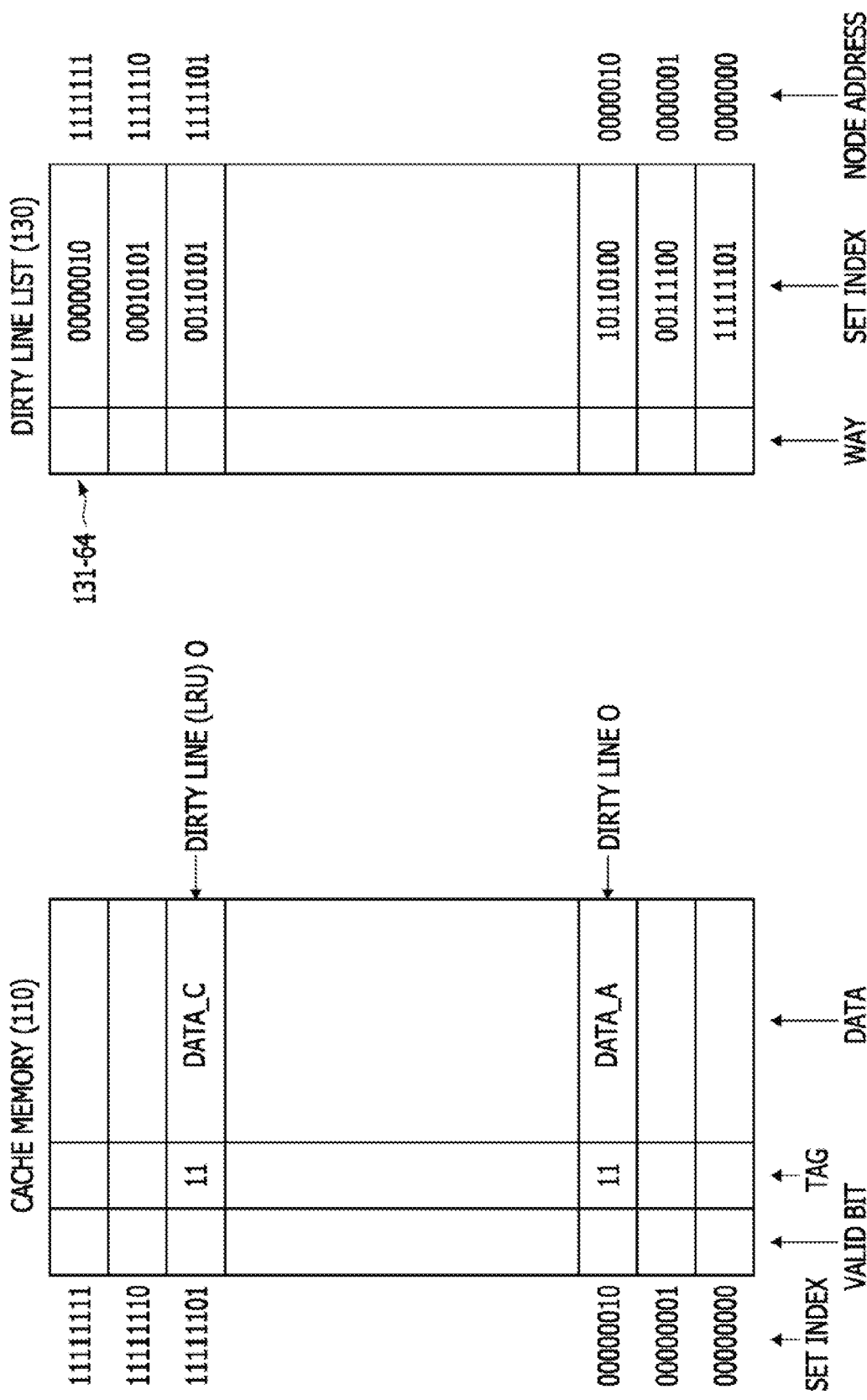

FIGS. 23 to 25 illustrate a process of controlling the dirty line list 130 when the number of dirty lines does not increase and the overflow occurs, based on a "write hit" in the cache system 100, according to an embodiment of the present disclosure. First, as illustrated in FIG. 23, the tag of '11' and the data DATA_B may be stored in a block, having a set index of '00000010' in the cache memory 110, and the tag of '11' and the data DATA_C may be stored in a block, having a set index of '11111101' in the cache memory 110. In the present embodiment, it may be assumed that the block storing the data DATA_B is a dirty line. That is, it may be assumed that the data DATA_B has not yet been written in a region of the memory having a memory address of '1100000010'. In addition, it may be assumed that the block, storing the data DATA_C, is a dirty line, particularly, an LRU dirty line. Moreover, set indexes may be stored in all of the nodes of the dirty line list 130, disposed from the lowest-order node 131-1, having a lowest-order node address of '0000000,' to the highest-order node 131-64, having a highest-order node address of '1111111', respectively. A set index '11111101' of the LRU dirty line may be stored in the node 131-1, having a lowest-order node address of '0000000,' in the dirty line list 130. A set index '00010101' of the MRU dirty line may be stored in the node 131-64, having a highest-order node address of '11111111,' in the dirty line list 130. In this status, if a write request, for writing the data DATA_A into a region of the memory, having a memory address of '1100000010,' occurs, the cache write operation may be performed to store the tag '11' and the data DATA_A into the block of the cache memory 110, having a set index of '00000010'.

The above example may correspond to a case in which the number of dirty lines does not increase at step 310 of FIG. 7 and the data DATA_A is regarded as a "write hit" at step 370 of FIG. 7, as described with reference to the flowchart of FIG. 7. Thus, the status information of the newly generated dirty line may be moved to the node, having a highest-order node address among the nodes, in which the status information of the dirty lines is stored (see step 380 of FIG. 7). Specifically, as illustrated in FIG. 24, the set index '00000010' of the newly generated dirty line, stored in the node 131-2, having a node address of '0000001,' may be moved to the node (i.e., the node 131-64), having a highest-order node address among the nodes having the status information of the dirty lines. As the set index '00000010,' stored in the node 131-2, is moved to the node 131-64, having a highest-order node address of '1111111', the set index '00010101,' originally stored in the node 131-64, having a highest-order node address of '1111111,' may be shifted to its immediately lower-order node 131-63. This shift of the set index may be sequentially executed until the node 131-2, which becomes empty due to the movement of the set index '00000010' of the newly generated dirty line, is filled with the set index '00111100,' originally stored in the node 131-3, as indicated by arrows between the nodes of FIG. 24. Because the block, having a set index of '00000010' in the cache memory 110, was a second LRU dirty line before the cache write operation, the status information (i.e., the set index '00000010') of the block was originally stored in the node 131-2 of the dirty line list 130. However, as illustrated in FIG. 25, the block, having a set index of '00000010' in the cache memory 110, may become an MRU dirty line after the cache write operation, and the status information (i.e., the set index '00000010') of the block may be stored into the node 131-64, having a highest-order node address of '1111111' among the nodes in the dirty line list 130.

Figure 26:
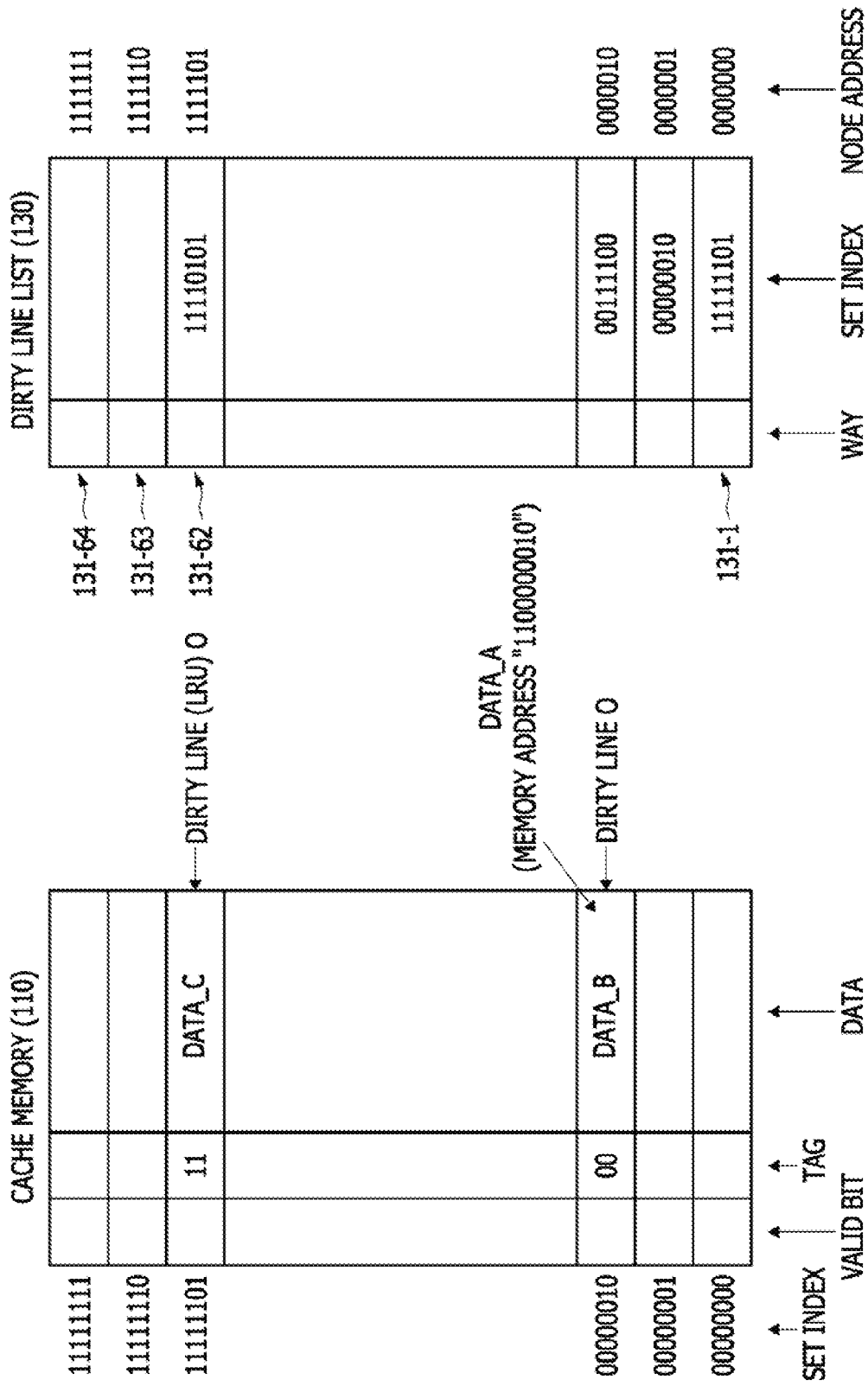
FIGS. 26 to 28 illustrate a process of controlling a dirty line list when the number of dirty lines does not increase and no overflow occurs with "write miss" in a cache system, according to an embodiment of the present disclosure.
Figure 27:
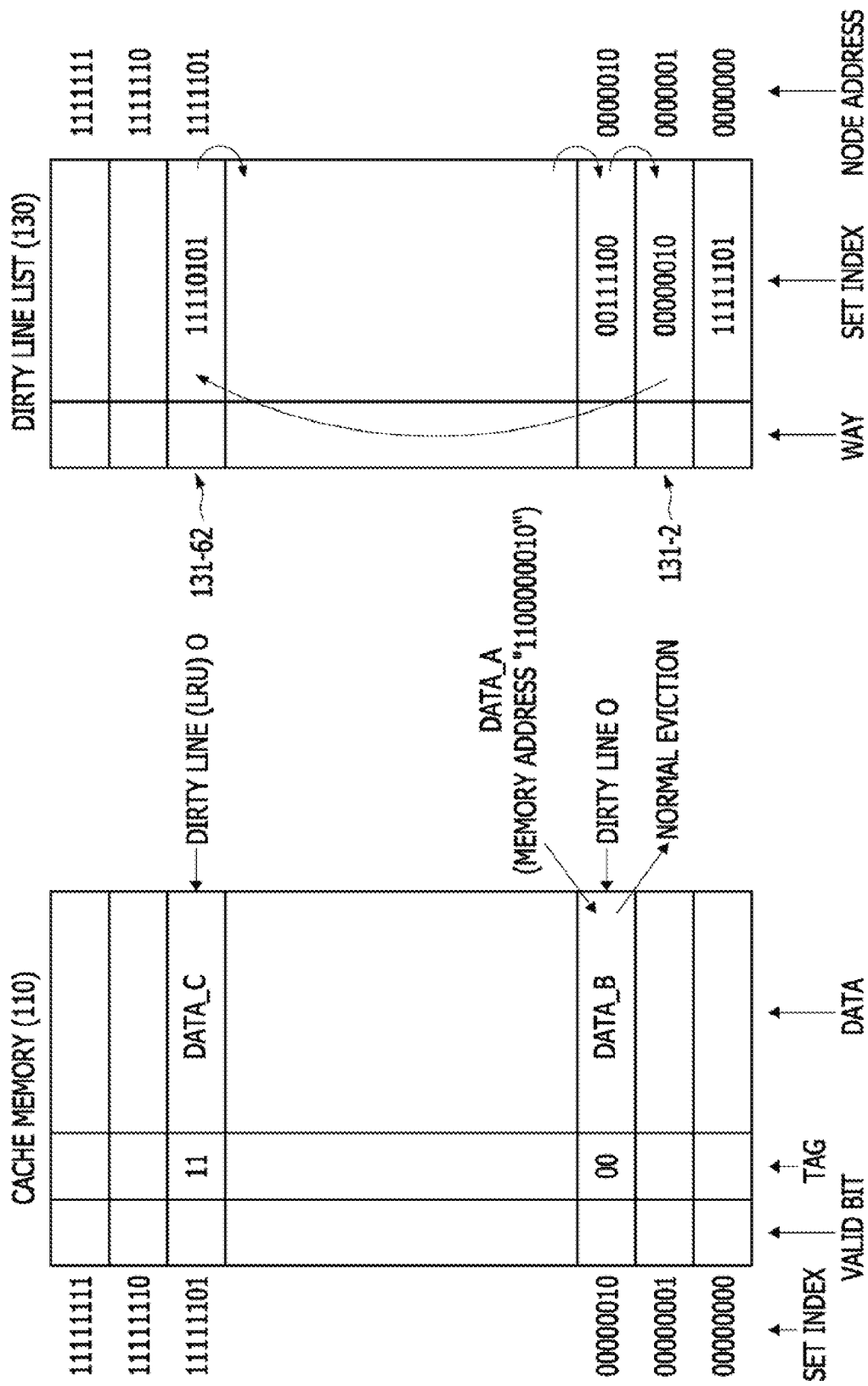
Figure 28:
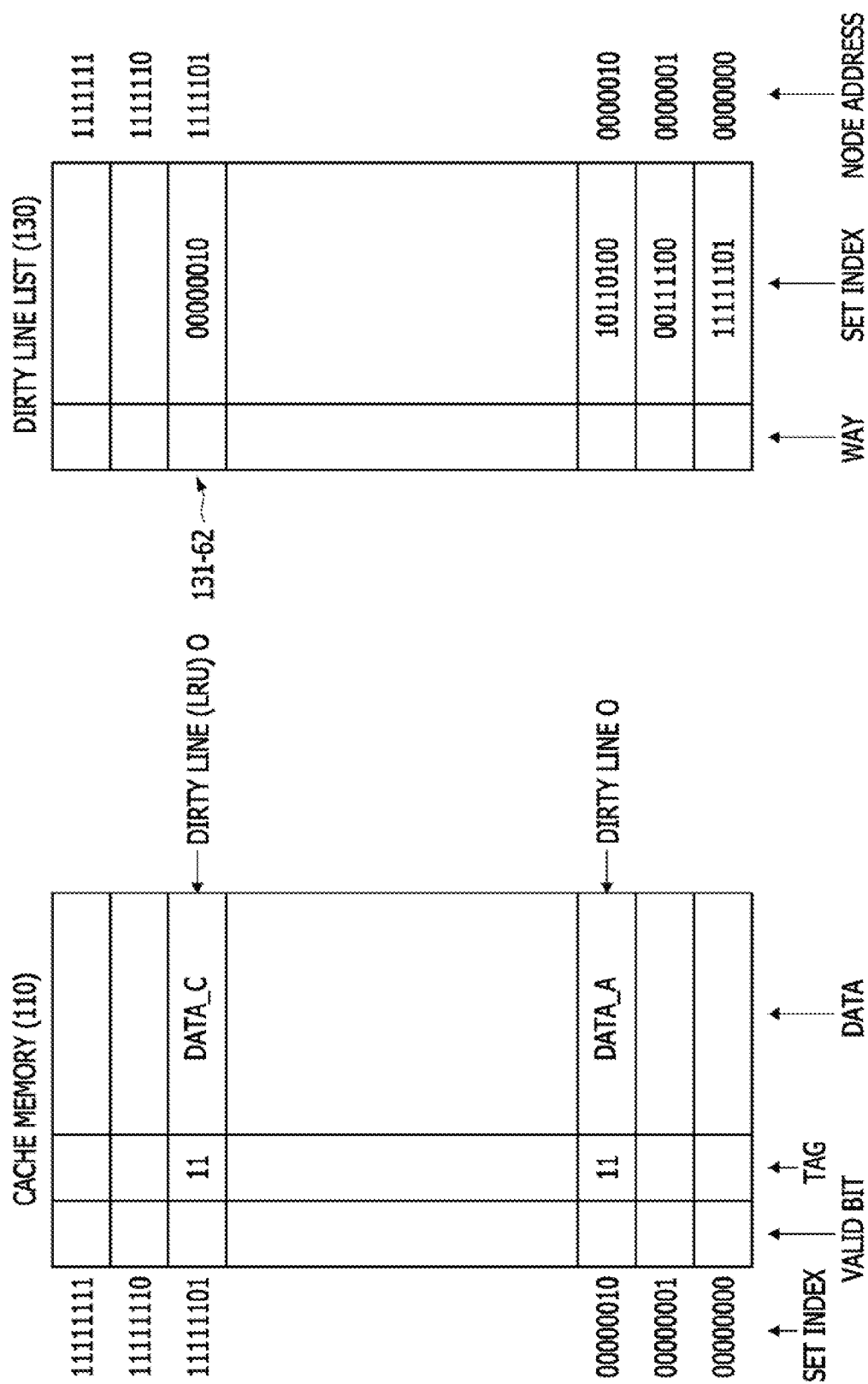

FIGS. 26 to 28 illustrate a process of controlling the dirty line list 130 when the number of dirty lines does not increase and no overflow occurs, based on a "write miss" in the cache system 100, according to an embodiment of the present disclosure. First, as illustrated in FIG. 26, the tag of '00' and the data DATA_B may be stored in a block, having a set index of '00000010' in the cache memory 110, and the tag of '11' and the data DATA_C may be stored in a block, having a set index of '11111101' in the cache memory 110. In the present embodiment, it may be assumed that the block storing the data DATA_B is a dirty line. That is, it may be assumed that the data DATA_B has not yet been written in a region of the memory having a memory address of '0000000010'. In addition, it may be assumed that the block storing the data DATA_C is a dirty line, particularly, an LRU dirty line. Moreover, set indexes may be stored in the nodes of the dirty line list 130, disposed from the lowest-order node 131-1, having a lowest-order node address of '0000000,' to the node 131-62, having a node address of '1111101', respectively. A set index '11111101' of the LRU dirty line may be stored in the node 131-1, having a lowest-order node address of '0000000' in the dirty line list 130. The node 131-63 (i.e., the second highest-order node), having a node address of '1111110,' and the highest-order node 131-64, having a node address of '1111111,' may be empty to avoid an overflow. In this status, if a write request for writing the data DATA_A into a region of the memory, having a memory address of '1100000010,' occurs, the cache write operation may be performed to store the tag '11' and the data DATA_A into the block of the cache memory 110, having a set index of '00000010'.

The above example may correspond to a case in which the number of dirty lines does not increase at step 310 of FIG. 7, and the data DATA_A is regarded as a "write miss" at step 370 of FIG. 7, as described with reference to the flowchart of FIG. 7. Thus, the status information of the dirty line, normally evicted, may be moved to a node having a highest-order node address among the nodes, in which the status information of the dirty lines is stored (see step 390 of FIG. 7). Specifically, as illustrated in FIG. 27, the set index '00000010' of the normally evicted dirty line, stored in the node 131-2, having a node address of '0000001,' may be moved to the node (i.e., the node 131-62), having a highest-order node address, among the nodes having the status information of the dirty lines. As the set index '00000010' stored in the node 131-2 is moved to the node 131-62, having a node address of '1111101', the set index '11110101,' originally stored in the node 131-62, having a node address of '1111101,' may be shifted to its immediately lower-order node. This shift of the set index may be sequentially executed until the node 131-2, which becomes empty due to the movement of the set index '00000010' of the newly generated dirty line, is filled with the set index '00111100,' originally stored in the node 131-3, as indicated by arrows between the nodes of FIG. 27. Because the block, having a set index of '00000010' in the cache memory 110, was a second LRU dirty line before the cache write operation, the status information (i.e., the set index '00000010') of the block was originally stored in the node 131-2 of the dirty line list 130. However, as illustrated in FIG. 28, the block, having a set index of '00000010' in the cache memory 110, may become an MRU dirty line after the cache write operation, and the status information (i.e., the set index '00000010') of the block may be stored into the node 131-62, having a highest-order node address among the nodes, filled with the status information of the dirty lines.

Figure 29:
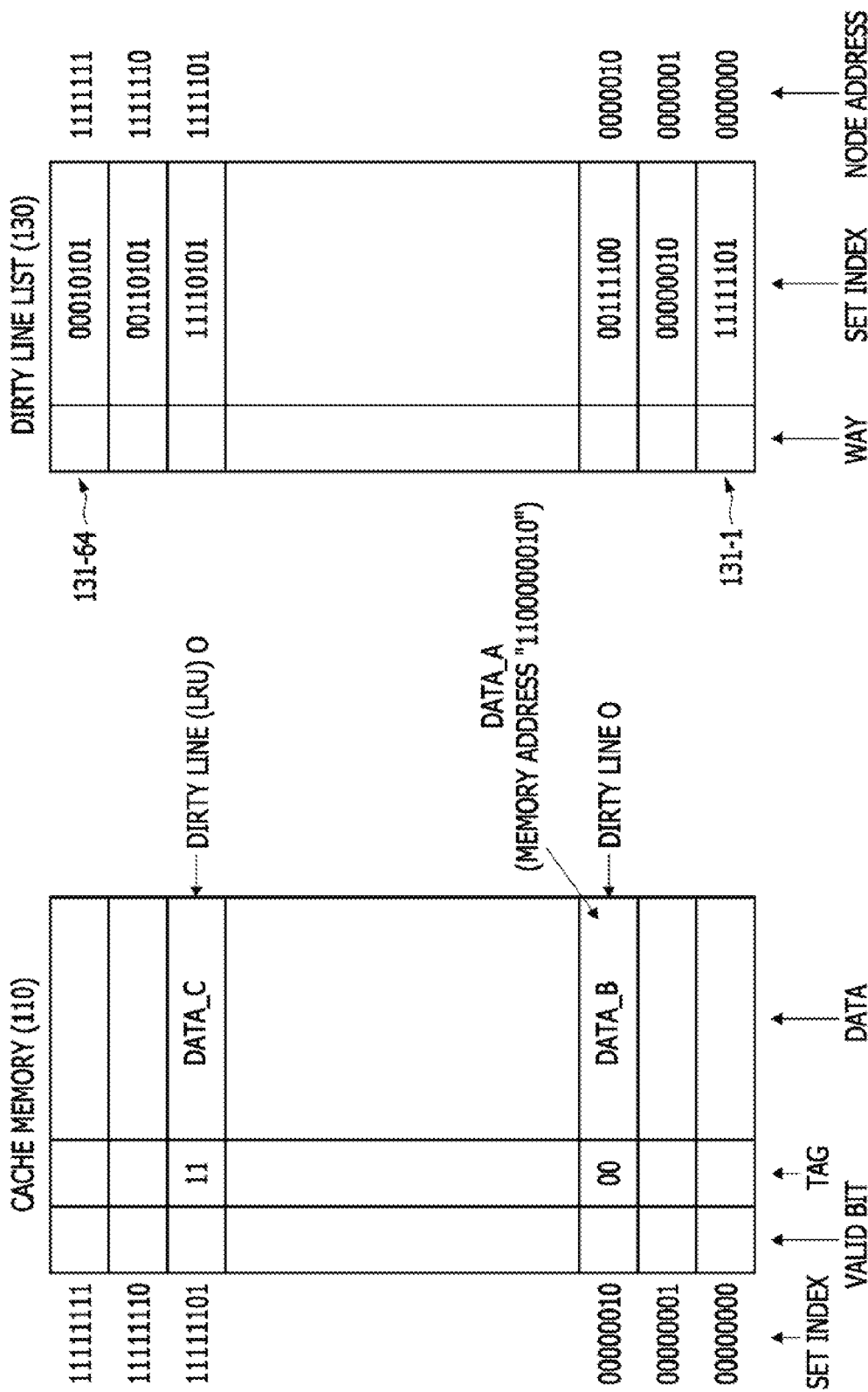
FIGS. 29 to 31 illustrate a process of controlling a dirty line list when the number of dirty lines does not increase and overflow occurs with "write miss" in a cache system, according to an embodiment of the present disclosure.
Figure 30:
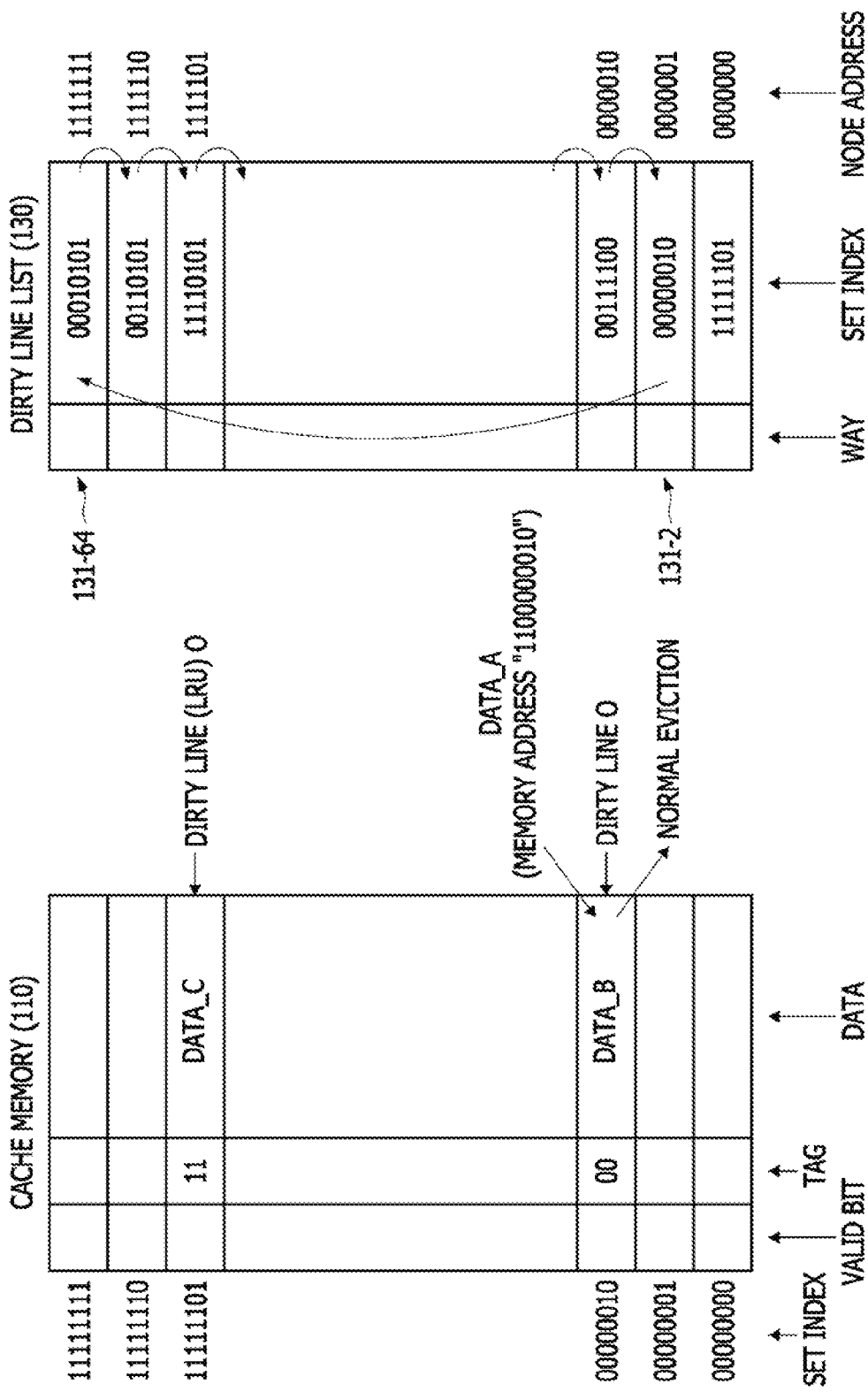
Figure 31:
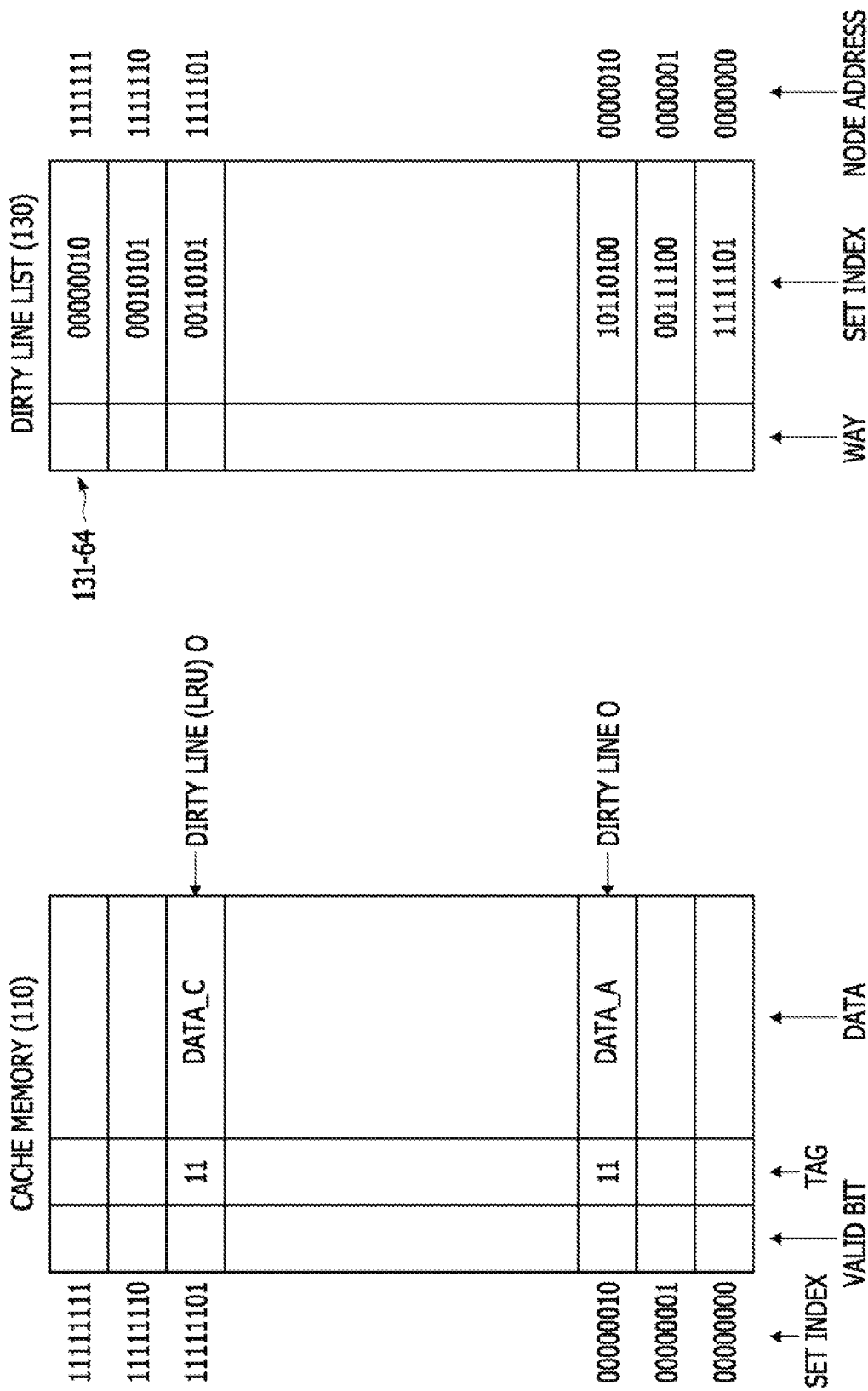

FIGS. 29 to 31 illustrate a process of controlling the dirty line list 130 when the number of dirty lines does not increase and the overflow occurs, based on a "write miss" in the cache system 100 according to an embodiment of the present disclosure. First, as illustrated in FIG. 29, the tag of '00' and the data DATA_B may be stored in a block, having a set index of '00000010' in the cache memory 110, and the tag of '11' and the data DATA_C may be stored in a block, having a set index of '11111101' in the cache memory 110. In the present embodiment, it may be assumed that the block storing the data DATA_B is a dirty line. That is, it may be assumed that the data DATA_B has not yet been written in a region of the memory having a memory address of '0000000010'. In addition, it may be assumed that the block storing the data DATA_C is a dirty line, particularly, an LRU dirty line. Moreover, set indexes may be stored in all of the nodes of the dirty line list 130, disposed from the lowest-order node 131-1, having a lowest-order node address of '0000000,' to the highest-order node 131-64, having a highest-order node address of '1111111', respectively. A set index '11111101' of the LRU dirty line may be stored in the node 131-1, having a lowest-order node address of '0000000,' in the dirty line list 130. A set index '00010101' of the MRU dirty line may be stored in the node 131-64, having a highest-order node address of '11111111' in the dirty line list 130. In this status, if a write request, for writing the data DATA_A into a region of the memory having a memory address of '1100000010,' occurs, the cache write operation may be performed to store the tag '11' and the data DATA_A into the block of the cache memory 110, having a set index of '00000010'.

The above example may correspond to a case in which the number of dirty lines does not increase at step 310 of FIG. 7, and the data DATA_A is regarded as a "write miss" at step 370 of FIG. 7, as described with reference to the flowchart of FIG. 7. Thus, the status information of the normally evicted dirty line may be moved to the node, having a highest-order node address, among the nodes in which the status information of the dirty lines is stored (see step 390 of FIG. 7). Specifically, as illustrated in FIG. 30, the set index '00000010' of the normally evicted dirty line, stored in the node 131-2, having a node address of '0000001,' may be moved to the node (i.e., the node 131-64), having a highest-order node address among the nodes having the status information of the dirty lines. As the set index '00000010,' stored in the node 131-2, is moved to the node 131-64, having a highest-order node address of '1111111', the set index '00010101,' originally stored in the node 131-64, having a highest-order node address of '1111111,' may be shifted to its immediately lower-order node 131-63. This shift of the set index may be sequentially executed until the node 131-2, which becomes empty, due to the movement of the set index '00000010' of the newly generated dirty line, is filled with the set index '00111100,' originally stored in the node 131-3, as indicated by arrows between the nodes of FIG. 30. Because the block, having a set index of '00000010' in the cache memory 110, was a second LRU dirty line before the cache write operation, the status information (i.e., the set index '00000010') of the block was originally stored in the node 131-2 of the dirty line list 130. However, as illustrated in FIG. 31, the block, having a set index of '00000010' in the cache memory 110, may become an MRU dirty line after the cache write operation, and the status information (i.e., the set index '00000010') of the block may be stored into the node 131-64, having a highest-order node address of '1111111,' among the nodes in the dirty line list 130.

The embodiments of the disclosed technology have been disclosed above for illustrative purposes. Those of ordinary skill in the art will appreciate that various modifications, additions, and substitutions are possible. While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:
1. A cache system comprising:
 a cache memory configured to have a plurality of blocks;
 a dirty line list configured to store status information of a predetermined number of dirty lines among dirty lines in the plurality of blocks; and a cache controller configured to control a data caching operation of the cache memory and configured to provide statuses and variation of statuses of the dirty lines, according to the data caching operation, to the dirty line list, wherein the cache controller performs a control operation to always store status information of a least-recently-used (LRU) dirty line into a predetermined storage location of the dirty line list, wherein the dirty line list includes a plurality of nodes in which the status information of the dirty lines is stored, and wherein the cache controller is configured to shift the status information of the dirty lines to their immediately lower-order nodes from a node in which status information of a dirty line generated through the data caching operation of the cache memory is moved and stored in a node which becomes empty due to a movement of status information of the dirty line generated by the data caching operation.

2. The cache system of claim 1, wherein the cache memory includes at least one way having the plurality of blocks.

3. The cache system of claim 1, wherein each block of the plurality of blocks of the cache memory is distinguished from one another by its own set indexes, each of which is comprised of a binary stream.

4. The cache system of claim 3, wherein each block of the plurality of blocks of the cache memory includes a valid bit, a tag and data.

5. The cache system of claim 3, wherein the dirty line list includes a plurality of nodes in which the status information of the dirty lines is stored.

6. The cache system of claim 5, wherein the number of the plurality of nodes, included in the dirty line list, is defined as the number of the blocks, for storing data, which are able to be written into a main memory, based on a chargeable element, when a suddenly-power-off (SPO) event occurs.

7. The cache system of claim 1,
wherein each block of the plurality of blocks of the cache memory is distinguished from each other by its own set indexes, each of which is comprised of a binary stream; and
wherein the status information of each of the dirty lines includes one of the set indexes of the cache memory.

8. The cache system of claim 1,
wherein locations of the plurality of nodes is determined by node addresses of the plurality of nodes.

9. The cache system of claim 8, wherein the status information of the LRU dirty line is always stored into a lowest-order node, having a lowest-order node address, among the plurality of nodes.

10. The cache system of claim 1,
wherein the cache controller controls the dirty line list such that if a value of a node address, designating each of the plurality of nodes, increases, the status information of a dirty line, having a less LRU time, is stored into a node having the increased value of the node address.

11. The cache system of claim 1,
wherein when the number of the dirty lines increases due to the data caching operation of the cache memory, causing an overflow, the cache controller regards a dirty line, having status information stored in a lowest-order node of the dirty line list, as the LRU dirty line and forcibly evicts the LRU dirty line, and
wherein the overflow involves the increased number of the dirty lines exceeding the number of the nodes in the dirty line list.

12. The cache system of claim 11, wherein the cache controller is configured to delete the status information of the dirty line evicted by force from the lowest-order node of the dirty line list, configured to shift the status information stored in the nodes to their immediately lower-order nodes, and configured to store status information of a dirty line newly generated through the data caching operation into a highest-order node in the dirty line list.

13. The cache system of claim 1,
wherein if the number of the dirty lines increases due to a data caching operation of the cache memory and no overflow occurs even though the number of the dirty lines increases, the cache controller stores status information of a dirty line newly generated by the data caching operation into a node having a lowest-order node address among empty nodes without any status information in the dirty line list.

14. The cache system of claim 1,
wherein, when there is a "write hit" without an increase in the number of the dirty lines even after the data caching operation of the cache memory, the cache controller shifts status information of a dirty line generated through the data caching operation to a node having a highest-order node address among nodes filled with status information of dirty lines in the dirty line list.

15. The cache system of claim 1,
wherein, when there is a "write miss" without an increase in the number of the dirty lines even after the data caching operation of the cache memory, the cache controller is configured to normally evict a dirty line stored in a block of the cache memory where data are written by a subsequent cache write operation and configured to move status information of the normally evicted dirty line to a node having a highest-order node address among nodes in which the status information of the dirty lines are stored in the dirty line list.

16. The cache system of claim 1,
wherein the cache controller is configured to shift the status information of the dirty lines to their immediately lower-order nodes from a node in which status information of the dirty line normally evicted through the data caching operation is moved and stored in a node which becomes empty due to the movement of status information of the normally evicted dirty line.

\* \* \* \* \*